United States Patent
Kent et al.

(10) Patent No.: US 7,593,493 B2
(45) Date of Patent: Sep. 22, 2009

(54) METHOD AND SYSTEM FOR PRE-EQUALIZATION IN A SINGLE WEIGHT (SW) SINGLE CHANNEL (SC) MULTIPLE-INPUT MULTIPLE-OUTPUT (MIMO) SYSTEM

(75) Inventors: Mark Kent, Vista, CA (US); Vinko Erceg, Cardiff, CA (US); Uri M. Landau, San Diego, CA (US); Pieter G. W. van Rooyen, San Diego, CA (US); Pieter Roux, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 548 days.

(21) Appl. No.: 11/172,702

(22) Filed: Jun. 30, 2005

(65) Prior Publication Data

US 2006/0072682 A1  Apr. 6, 2006

Related U.S. Application Data

(60) Provisional application No. 60/616,733, filed on Oct. 6, 2004.

(51) Int. Cl.
*H04B 1/10* (2006.01)
(52) U.S. Cl. .................... 375/349; 375/350
(58) Field of Classification Search .......... 375/144, 375/148, 260, 267, 285, 347–350, 358; 455/68–69
See application file for complete search history.

(56) References Cited

U.S. PATENT DOCUMENTS

| | | | | |
|---|---|---|---|---|
| 5,819,168 A | * | 10/1998 | Golden et al. | 455/303 |
| 6,097,773 A | * | 8/2000 | Carter et al. | 375/347 |
| 6,115,409 A | * | 9/2000 | Upadhyay et al. | 375/144 |
| 6,128,276 A | | 10/2000 | Agee | |
| 6,594,473 B1 | * | 7/2003 | Dabak et al. | 455/101 |
| 6,728,307 B1 | * | 4/2004 | Derryberry et al. | 375/219 |

(Continued)

OTHER PUBLICATIONS

Jan Mietzner and Peter A. Hoeher, University of Kiel, Adaptive Antennas and MIMO Systems for Wireless Communications, *Boosting the Performance of Wireless Communication Systems: Theory and Practice of Multiple-Antenna Techniques*, IEEE Communications Magazine, Oct. 2004, pp. 40-47.

(Continued)

*Primary Examiner*—Khanh C Tran
(74) *Attorney, Agent, or Firm*—McAndrews, Held & Malloy, Ltd.

(57) ABSTRACT

In wireless systems, a method and system for pre-equalization in a single weight (SW) single channel (SC) multiple-input multiple-output (MIMO) system are provided. A first receive antenna and at least one additional receive antenna may receive a plurality of SC communication signals transmitted from at least two transmit antennas. Estimates of the propagation channels between transmit and receive antennas may be performed concurrently and may be determined from baseband combined channel estimates. Channel weights may be determined to modify the signals received by the additional receive antennas. Pre-equalization weight parameters may be determined to modify subsequent signals transmitted from the transmit antennas. The pre-equalization weight parameters may be based on the propagation channel estimates and may be determined by LMS, RLS, DMI, or by minimizing a cost function. Closed loop transmit diversity may also be supported.

20 Claims, 12 Drawing Sheets

U.S. PATENT DOCUMENTS

| | | | |
|---|---|---|---|
| 6,778,612 B1 * | 8/2004 | Lozano et al. | 375/299 |
| 6,987,819 B2 * | 1/2006 | Thomas et al. | 375/342 |
| 7,020,175 B2 * | 3/2006 | Frank | 375/130 |
| 7,266,157 B2 * | 9/2007 | Sim et al. | 375/267 |
| 7,447,270 B1 * | 11/2008 | Hottinen | 375/267 |
| 2003/0031234 A1 | 2/2003 | Smee et al. | |
| 2005/0243898 A1 | 11/2005 | Reznik et al. | |
| 2007/0015545 A1 | 1/2007 | Leifer et al. | |

OTHER PUBLICATIONS

Simon Haykin, McMaster University; Mathini Sellathurai, Yvo de Jong, and Tricia Willink, Communications Research Centre Canada, Adaptive Antennas and MIMO Systems for Wireless Communications, *Turbo-MIMO for Wireless Communications*, IEEE Communications Magazine, Oct. 2004, pp. 48-53.

David J. Love, Purdue University, Robert W. Heath Jr., University of Texas at Austin and Wiroonsak Santipach and Michael L. Honig, Northwestern University; Adaptive Antennas and MIMO Systems for Wireless Communications, *What is the Value of Limited Feedback for MIMO Channels?*, IEEE Communications Magazine, Oct. 2004, pp. 54-59.

Quentin H. Spencer, Distribution Control Systems, Inc., Christian B. Peel, Swiss Federal Institute of Technology, A. Lee Swindlehurst, Brigham Young University, Martin Haardt, Ilmenau University of Technology, Adaptive Antennas and MIMO Systems for Wireless Communications, *An Introduction to the Multi-User MIMO Downlink*, IEEE Communications Magazine, Oct. 2004, pp. 60-67.

Shahab Sanayei and Aria Nosratinia, University of Texas at Dallas, Adaptive Antennas and MIMO Systems for Wireless Communications, *Antenna Selection in MIMO Systems*, IEEE Communications Magazine, Oct. 2004, pp. 68-73.

Aria Nosratinia, University of Texas, Dallas, Todd E. Hunter, Nortel Networks, Ahmadreza Hedayat, University of Texas, Dallas, *Cooperative Communication in Wireless Networks*, IEEE Communications Magazine, Oct. 2004, pp. 74-80.

Jack H. Winters, *Optimum Combining for Indoor Radio Systems with Multiple Users*, IEEE Communications Magazine, vol. COM-35, No. 11, Nov. 1987, pp. 1222-1230.

3rd Generation Partnership Project; *Technical Specification Group Radio Access Network; Physical Layer Procedures (FDD) (Release 6)*, 3GPP TS 25.214 V6.2.0 (2004-06), pp. 1-64.

* cited by examiner

METHOD AND SYSTEM FOR PRE-EQUALIZATION IN A SINGLE WEIGHT (SW) SINGLE CHANNEL (SC) MULTIPLE-INPUT MULTIPLE-OUTPUT (MIMO) SYSTEM

CROSS-REFERENCE TO RELATED APPLICATIONS/INCORPORATION BY REFERENCE

This patent application makes reference to, claims priority to and claims benefit from U.S. Provisional Patent Application Ser. No. 60/616,733 filed on Oct. 6, 2004.

This application makes reference to:

U.S. patent application Ser. No. 11/173,870 filed Jun. 30, 2005;

U.S. patent application Ser. No. 11/174,303 filed Jun. 30, 2005;

U.S. patent application Ser. No. 11/173,502 filed Jun. 30, 2005;

U.S. patent application Ser. No. 11/173,871 filed Jun. 30, 2005;

U.S. patent application Ser. No. 11/173,964 filed Jun. 30, 2005;

U.S. patent application Ser. No. 11/173,252 filed Jun. 30, 2005;

U.S. patent application Ser. No. 11/174,252 filed Jun. 30, 2005;

U.S. patent application Ser. No. 11/172,756 filed Jun. 30, 2005;

U.S. patent application Ser. No. 11/173,305 filed Jun. 30, 2005;

U.S. patent application Ser. No. 11/172,759 filed Jun. 30, 2005;

U.S. patent application Ser. No. 11/173,689 filed Jun. 30, 2005;

U.S. patent application Ser. No. 11/173,304 filed Jun. 30, 2005;

U.S. patent application Ser. No. 11/173,129 filed Jun. 30, 2005;

U.S. patent application Ser. No. 11/172,779 filed Jun. 30, 2005;

U.S. patent application Ser. No. 11/173,727 filed Jun. 30, 2005;

U.S. patent application Ser. No. 11/173,726 filed Jun. 30, 2005;

U.S. patent application Ser. No. 11/172,781 filed Jun. 30, 2005;

U.S. patent application Ser. No. 11/174,067 filed Jun. 30, 2005;

U.S. patent application Ser. No. 11/173,854 filed Jun. 30, 2005;

U.S. patent application Ser. No. 11/173,911 filed Jun. 30, 2005; and

U.S. patent application Ser. No. 11/174,403 filed Jun. 30, 2005.

Each of the above referenced applications is hereby incorporated herein by reference in its entirety.

FIELD OF THE INVENTION

Certain embodiments of the invention relate to the processing of wireless communication signals. More specifically, certain embodiments of the invention relate to a method and system for pre-equalization in a single weight (SW) single channel (SC) multiple-input multiple-output (MIMO) system.

BACKGROUND OF THE INVENTION

In most current wireless communication systems, nodes in a network may be configured to operate based on a single transmit and a single receive antenna. However, for many of current wireless systems, the use of multiple transmit and/or receive antennas may result in an improved overall system performance. These multi-antenna configurations, also known as smart antenna techniques, may be utilized to reduce the negative effects that multipath and/or signal interference may have on signal reception. Existing systems and/or systems which are being currently deployed, for example, CDMA-based systems, TDMA-based systems, WLAN systems, and OFDM-based systems such as IEEE 802.11 a/g/n, may benefit from configurations based on multiple transmit and/or receive antennas. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and/or an array gain and to suppress interference generated within the signal reception process. Such diversity gains improve system performance by increasing received signal-to-noise ratio, by providing more robustness against signal interference, and/or by permitting greater frequency reuse for higher capacity. In communication systems that incorporate multi-antenna receivers, a set of M receive antennas may be utilized to null the effect of (M−1) interferers, for example. Accordingly, N signals may be simulataneously transmitted in the same bandwidth using N transmit antennas, with the transmitted signal then being separated into N respective signals by way of a set of N antennas deployed at the receiver. Systems that utilize multiple transmit and multiple receive antenna may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR).

However, the widespread deployment of multi-antenna systems in wireless communications, particularly in wireless handset devices, has been limited by the increased cost that results from increased size, complexity, and power consumption. Providing a separate RF chain for each transmit and receive antenna is a direct factor that increases the cost of multi-antenna systems. Each RF chain generally comprises a low noise amplifier (LNA), a filter, a downconverter, and an analog-to-digital converter (A/D). In certain existing single-antenna wireless receivers, the single required RF chain may account for over 30% of the receiver's total cost. It is therefore apparent that as the number of transmit and receive antennas increases, the system complexity, power consumption, and overall cost may increase.

In the case of a single RF chain with multiple antennas, there is the need to determine or estimate separate propagation channels. A simple method may comprise switching to a first receive antenna utilizing, for example, an RF switch, and estimate a first propagation channel. After estimating the first propagation channel, another receive antenna may be selected and its corresponding propagation channel may be estimated. In this regard, this process may be repeated until all the channels have been estimated. However, switching between receive antennas may disrupt the receiver's modem and may lower throughput. This approach may require additional hardware and may also result in propagation channel estimates at different time intervals. Any mechanisms that may be utilized to compensate for the presence of multiple time-varying propagation channels may also present added complexity and cost to the design and operation of MIMO systems.

A single weight approach may work best for a single path, that is, for flat fading channels, because a single weight may not combine all paths arriving at different delays optimally. To optimally combine each multipath at receiving antennas may require multiple weights at different delays. For example, the same number of weights as multipaths arriving at different delays may be required, which may be more like a complete channel equalization approach. On the other hand, utilizing a single weight may have an average combining effect on multiple paths, with sub-optimal performance. A single weight may not be selected so that an optimized combination of multiple paths may be achieved at the receiving antennas. For example, for a Rayleigh flat fading channel, a single weight solution may result in about a 6 dB gain, while for the channels with many Rayleigh faded paths the gain may be reduced to about 2 dB.

Moreover, multi-path propagation in band-limited time dispersive channels may cause inter-symbol interference (ISI), which has been recognized as a major obstacle in achieving increased digital transmission rates with the required accuracy. ISI may occur when the transmitted pulses are smeared out so that pulses that correspond to different symbols are not discernable or separable. Meanwhile, data received from a desired user may be disturbed by other transmitters, due to imperfections in the multiple access scheme, giving rise to inter-carrier interference (ICI). For a reliable digital transmission system, it is necessary to reduce the effects of ISI and ICI.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for pre-equalization in a single weight (SW) single channel (SC) multiple-input multiple-output (MIMO) system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1A:
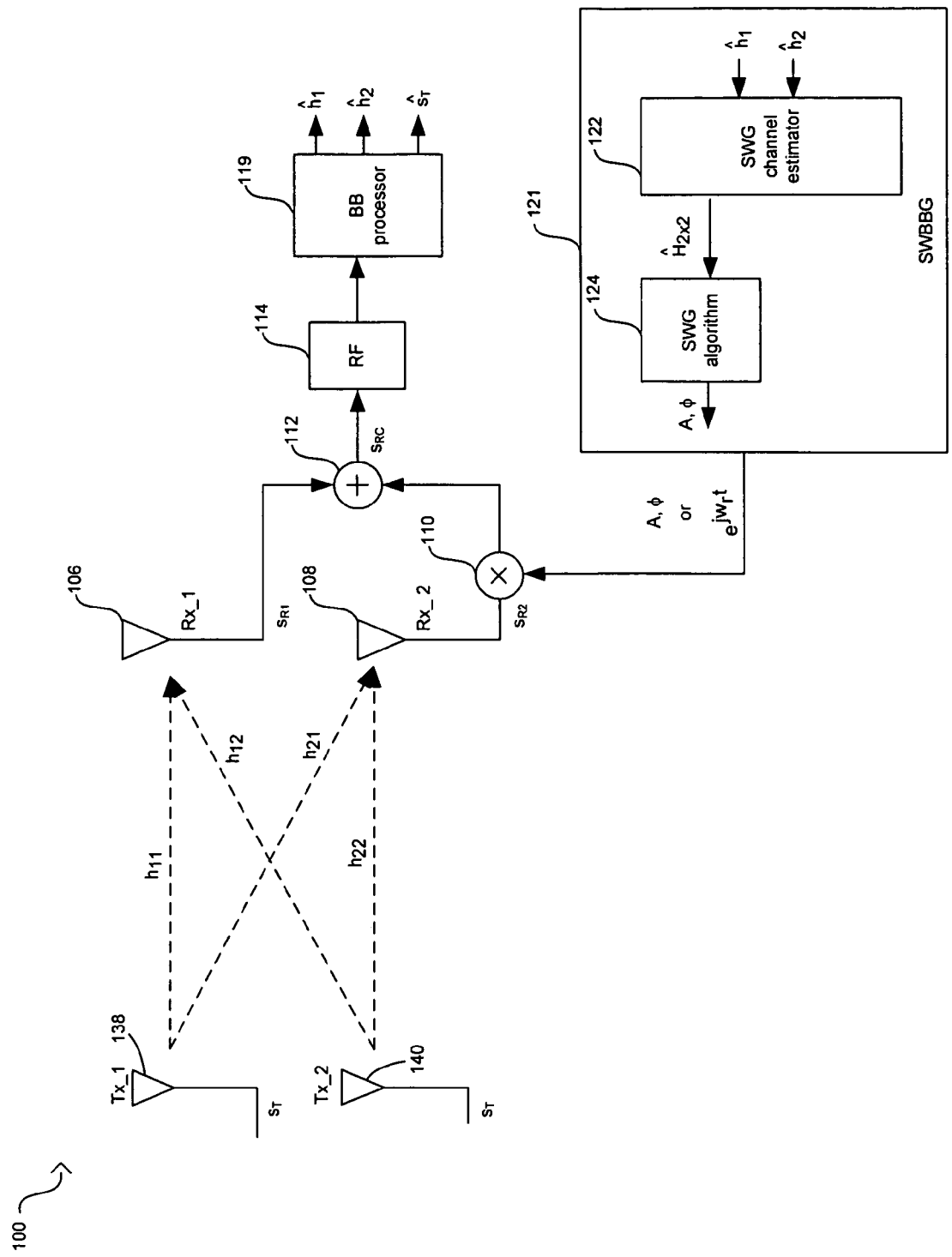
FIG. 1A is a block diagram of an exemplary two-transmit (2-Tx) and two-receive (2-Rx) antennas wireless communication, in accordance with an embodiment of the invention.

Certain embodiments of the invention may be found in a method and system for pre-equalization in a single weight (SW) single channel (SC) multiple-input multiple-output (MIMO) system. A first receive antenna and at least one additional receive antenna may receive a plurality of SC communication signals transmitted from at least two transmit antennas. Estimates of the propagation channels between transmit and receive antennas may be performed concurrently and may be determined from baseband combined channel estimates. Channel weights may be determined to modify the signals received by the additional receive antennas. Pre-equalization weight parameters may be determined to modify subsequent signals transmitted from the transmit antennas.

The pre-equalization weight parameters may be based on the propagation channel estimates and may be determined by LMS, RLS, DMI, or by minimizing a cost function. Closed loop transmit diversity may also be supported. The various embodiments of the invention may provide a good compromise between implementation complexity and performance gains to reduce the effects of, for example, inter-symbol interference (ISI) and/or inter-carrier interference (ICI) in MIMO systems.

Most communication channels suffer from multipath fading. To address multipath fading, different equalizer techniques may be used. Generally, equalization algorithms may be implemented at the receiver side of a communication link. However when the equalizer weight solution is available at the transmitter, then pre-equalizer techniques may be used. The method of equalization may be the same for pre-equalization at the transmitter and post-equalization at the receiver when the optimal weights become the inverse conjugate of the channel, for example. The weights may therefore be applied at either the transmitter during pre-equalization or at the receiver during post-equalization. These weights may be optimal when there is no interference present in the system. When any interference sources are present in the system, the optimum weights for the pre-equalization and post-equalization may be different. One of the benefits of using pre-equalizer techniques lies in the simplification of the receiver architecture that results from moving the complexity of the equalization operation to the transmitter. However, pre-equalizer techniques may be related to the feedback of the channel estimates. The delay may cause some lag between the received symbols and the corresponding transmitted symbols. Pre-equalization weights may be calculated for vector and matrix channels and applied to the transmitted symbols accordingly.

An approach that supports channel pre-equalization at the transmitter may be utilized to improve upon the use of a single weight solution when multipath signals are received by multiple receive antennas. The purpose of pre-equalization is to make signals appear at the receiver as a single path, that is, a flat fading channel. In the case of flat fading channels the two receive antenna SW solution may yield maximum gain that may approach 6 dB gain in flat fading Rayleigh channels, for example. A problem with pre-equalization with multiple receive antenna systems is that the pre-equalization may not pre-equalize the channels optimally for all multiple receiving antennas. An averaging effect may occur, which pre-equalizes the multipath channel at the multiple receiving antennas partially.

FIG. 1A is a block diagram of an exemplary two-transmit (2-Tx) and two-receive (2-Rx) antennas wireless communication, in accordance with an embodiment of the invention. Referring to FIG. 1A, there is shown a wireless communication system 100 that may comprise a first transmit antenna (Tx_1) 138, an additional transmit antenna (Tx_2) 140, a first receive antenna (Rx_1) 106, and an additional receive antenna (Rx_2) 108. The wireless communication system 100 may further comprise a mixer 110, an adder 112, an RF block 114, a baseband (BB) processor 119, a single weight baseband generator (SWBBG) 121, a single weight generator (SWG) channel estimator 122, and a SWG algorithm block 124.

The first transmit antenna, Tx_1 138, and the additional or second transmit antenna, Tx_2 140, may comprise suitable hardware that may be adapted to transmit a plurality of SC communication signals, ST, from a wireless transmitter device. The first receive antenna, Rx_1 106, and the additional or second receive antenna, Rx_2 108, may comprise suitable hardware that may be adapted to receive at least a portion of the transmitted SC communication signals in a wireless receiver device. For example, the receive antenna Rx_1 106 may receive signal $s_{R1}$ while the receive antenna Rx_2 108 may receive signal $s_{R2}$. The propagation channels that corresponds to the paths taken by the SC communication signals transmitted from the transmit antennas Tx_1 138 and Tx_2 140 and received by the receive antenna Rx_1 106 may be represented by $h_{11}$ and $h_{12}$ respectively. In this regard, $h_{11}$ and $h_{12}$ may represent the actual time varying impulse responses of the radio frequency (RF) paths taken by the SC communication signals transmitted from the transmit antennas Tx_1 138 and Tx_2 140 and received by the receive antenna Rx_1 106. The actual time varying impulse responses, $h_{xy}$, may contain multiple propagation paths arriving at different delays.

Similarly, the propagation channels that corresponds to the paths taken by the SC communication signals transmitted from the transmit antennas Tx_1 138 and Tx_2 140 and received by the receive antenna Rx_2 108 may be represented by $h_{21}$ and $h_{22}$ respectively. In this regard, $h_{21}$ and $h_{22}$ may represent the actual time varying impulse responses of the RF paths taken by the SC communication signals transmitted from the transmit antennas Tx_1 138 and Tx_2 140 and received by the receive antenna Rx_2 108. In some instances, a wireless transmitter device may be adapted to periodically transmit calibration and/or pilot signal that may be utilized by a 2-Rx antennas wireless receiver device to determine estimates of $h_{11}$, $h_{12}$, $h_{21}$, and $h_{22}$. The 2-Tx and 2-Rx antennas wireless communication system 100 in FIG. 1A may represent a MIMO communication system.

The mixer 110 may comprise suitable logic and/or circuitry that may be adapted to operate as a complex multiplier that may modify the amplitude and/or phase of the portion of the SC communication signals received by the receive antenna Rx_2 108 via a rotation waveform $e^{jw_r t}$ provided by the SWBBG 121, where $w_r=2\pi f_r$ and $f_r$ is the rotation frequency. In this regard, a channel weight comprising an amplitude component and phase component may be provided by the SWBBG 121 for modifying the signal received by the receive antenna Rx_2 108 to achieve channel orthogonality between the receive antenna Rx_1 106 and the receive antenna Rx_2 108. In some implementations, the mixer 110 may comprise a variable gain amplifier and a phase shifter, for example.

Through the achieved channel orthogonality, estimates of $h_{11}$, $h_{12}$, $h_{21}$, and $h_{22}$ may be determined by the SWG channel estimator 122 in the SWBBG 121. The $h_{11}$, $h_{12}$, $h_{21}$, and $h_{22}$ estimates may be utilized by the SWG algorithm block 124 to determine an optimum amplitude A and phase $\phi$ that modify signals received by the receive antenna Rx_2 108 via mixer 110 so that the receiver signal-to-interference-and-noise ratio (SINR) is maximized, for example. In some instances, instead of utilizing the rotation waveform $e^{jw_r t}$ to achieve the channel orthogonality between the receive antenna Rx_1 106 and the receive antenna Rx_2 108, square or triangular waveforms may be also utilized. Moreover, waveforms representing different orthogonal codes may also be utilized, similar to the CDMA orthogonal codes with the same spreading.

The output of the mixer 110 may be transferred to a bandpass filter, a low noise amplifier (LNA), and/or a phase shifter for further processing of the received signals. The adder 112 may comprise suitable hardware, logic, and/or circuitry that may be adapted to add the output of the receive antenna Rx_1 106 and the output of the mixer 110 to generate a combined received SC communication signal, $s_{RC}$. In some instances, bringing the output signals of the receive antenna Rx_1 106 and the mixer 110 together into a single electrical connection may provide the functionality of the adder 112. Notwithstanding, an output of the adder 112 may be transferred to the RF block 114 for further processing of the combined received SC communication signal, $s_{RC}$.

The RF block 114 may comprise suitable logic and/or circuitry that may be adapted to process the combined received SC communication signal, $s_{RC}$. The RF block 114 may perform, for example, filtering, amplification, and/or analog-to-digital (A/D) conversion operations. The BB processor 119 may comprise suitable logic, circuitry, and/or code that may be adapted to determine a first baseband combined channel estimate, $\hat{h}_1$, which may comprise information regarding propagation channels $h_{11}$ and $h_{21}$. The BB processor 119 may also be adapted to process the output of the RF block 114 to determine a second baseband combined channel estimate, $\hat{h}_2$, which may comprise information regarding propagation channels $h_{12}$ and $h_{22}$. The BB processor 119 may also be adapted to determine an estimate of the transmitted SC communication signals, $\hat{s}_T$.

The SWBBG 121 may comprise suitable logic, circuitry, and/or code that may be adapted to receive the first and second baseband combined channel estimates, $\hat{h}_1$ and $\hat{h}_2$, from the BB processor 119 and generate phase and amplitude components of the rotation waveform to be applied by the mixer 110 to modify the portion of the SC communication signals received by the receive antenna Rx_2 108, $s_{R2}$. The SWG channel estimator 122 may comprise suitable logic, circuitry, and/or code that may be adapted to process the first and second baseband combined channel estimates, $\hat{h}_1$ and $\hat{h}_2$, generated by the BB processor 119 and may determine a matrix $\hat{H}_{2\times2}$ of propagation channel estimates $\hat{h}_{11}$, $\hat{h}_{12}$, $\hat{h}_{21}$, and $\hat{h}_{22}$, which correspond to estimates of a matrix $H_{2\times2}$ of time varying impulse responses $h_{11}$, $h_{12}$, $h_{21}$, and $h_{22}$ respectively. The actual time varying impulse responses, $h_{xy}$, may contain multiple propagation paths arriving at different delays. In that regard, the matrix $\hat{H}_{2\times2}$ of propagation channel estimates $\hat{h}_{11}$, $\hat{h}_{12}$, $\hat{h}_{21}$, and $\hat{h}_{22}$ may consist of multiple path estimates arriving at different delays. The SWG algorithm block 124 may comprise suitable logic, circuitry, and/or code that may be adapted to determine a channel weight to be transferred to the mixer 110 to modify the signal $s_{R2}$ so that the receiver SINR is maximized. The channel weight to be transferred to the mixer 110 may refer to a phase, $\phi$, and amplitude, A, that results in a maximum SINR.

Figure 1B:
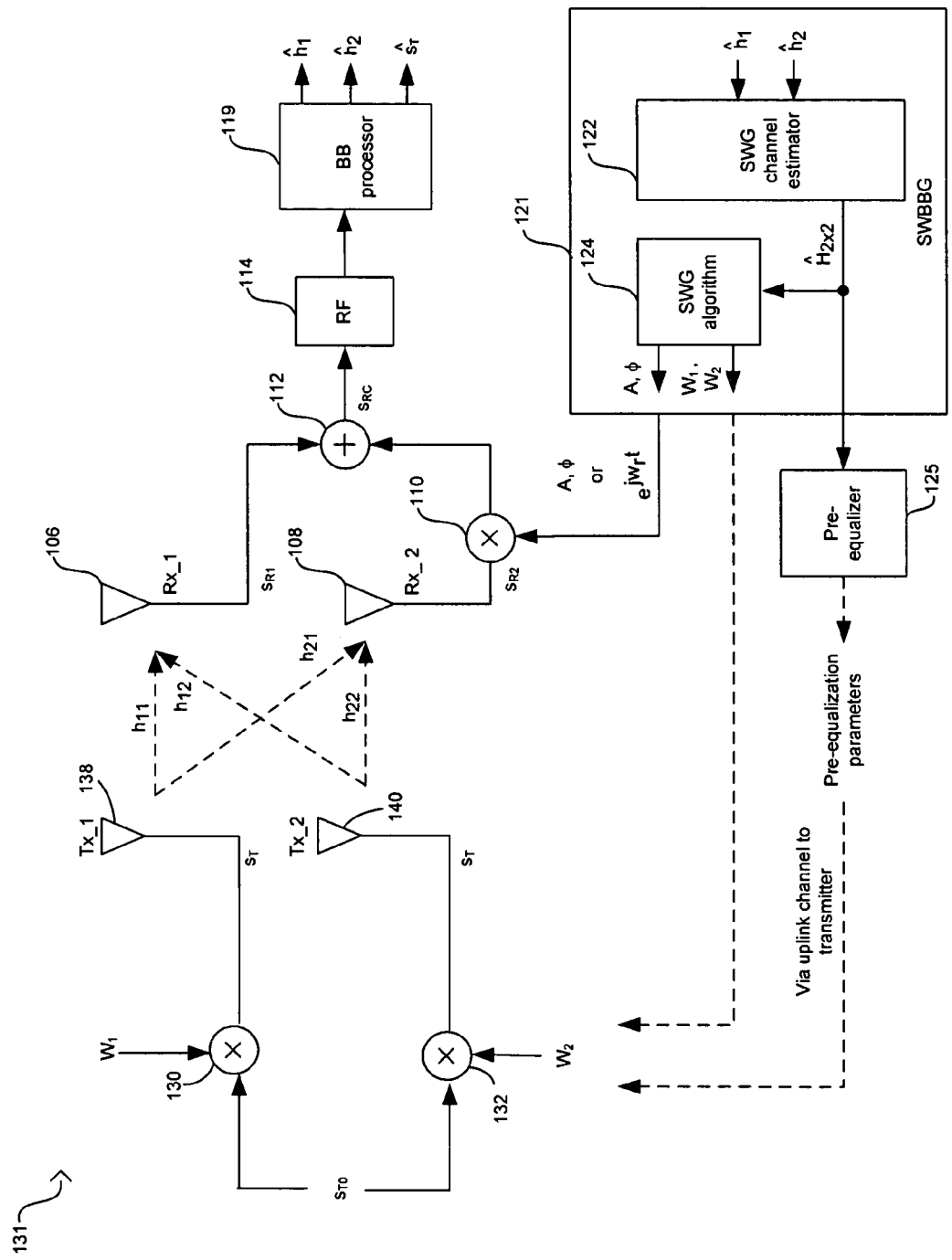
FIG. 1B is a block diagram of an exemplary two-transmit (2-Tx) and two-receive (2-Rx) antennas wireless communication with pre-equalization, in accordance with an embodiment of the invention.

FIG. 1B is a block diagram of an exemplary two-transmit (2-Tx) and two-receive (2-Rx) antennas wireless communication with pre-equalization, in accordance with an embodiment of the invention. Referring to FIG. 1B, there is shown a wireless communication system 131 that may differ from the wireless communication system 100 in FIG. 1A in that the wireless communication system 131 further comprises mixers 130 and 132 and a pre-equalizer 125.

The mixers 130 and 132 may comprise suitable logic and/or circuitry that may be adapted to multiply a signal to be transmitted, $s_{T0}$, with weight factors $W_1$ and $W_2$ respectively. For example, the weight factors $W_1$ and $W_2$ may correspond to phase and/or amplitude component feedback adjustments that may be generated by the pre-equalizer 125. In this regard, the pre-equalizer 125 may transfer the weight factors or parameters that correspond to those weight factors to the transmitter via an uplink feedback process.

The pre-equalizer 125 may comprise suitable logic, circuitry, and/or code that may be adapted to determine a plurality of pre-equalization parameters and/or weight factors $W_1$ and $W_2$ based on the matrix $\hat{H}_{2\times2}$ of propagation channel estimates $\hat{h}_{11}$, $\hat{h}_{12}$, $\hat{h}_{21}$, and $\hat{h}_{22}$. The pre-equalization parameters may comprise phase and amplitude information to be transferred to the transmitter portion of the wireless communication system 131. The weights or weight parameters determined by the pre-equalizer 125 may be a single channel tap or a weight vector for a frequency selective propagation channel. Moreover, the pre-equalizer 125 may be adapted to determine the pre-equalization parameters based on, for example, a least-mean squares (LMS) algorithm, a recursive least squares (RLS) algorithm, direct matrix inversion, a cost function analysis, or a second order statistical technique. When utilizing a cost function analysis, for example, coefficients utilized by the pre-equalizer to determine the pre-equalization parameters may be obtained based on the minimization of a cost function, J, of the form $J=f(SINR)$ or $J=f(SNR)$, where $f(x)$ denotes a function of variable x and SINR and SNR are the signal-to-interference-and-noise ratio and signal-to-noise ratio of the received signals respectively. For example, a cost function $J=(SINR)^{-1}$ may be minimized to obtain pre-equalizer coefficients that may be utilized to determine the pre-equalization parameters. The pre-equalizer may apply and/or modify cost function parameters associated with variables utilized with the cost function. In certain instances, pre-coding techniques may be utilized in order to require less complicated processing of the pre-equalization parameters on the receiver side.

The SWG algorithm block 124 in FIG. 1B may be adapted to support two-transmit antenna closed loop mode 1 (CL1) and closed loop mode 2 (CL2) for transmit diversity as described in the $3^{rd}$ Generation Project Partnership (3GPP), Technical Specification Group Radio Access Network, Physical Layer Procedures (FDD), Release 6 (3GPP TS 25.214 V5.5.0, 2003-06). When either CL1 or CL2 are active, the wireless communication system 131 may be said to be in an active closed loop mode of operation. The SWG algorithm block 124 may generate weight factors $W_1$ and $W_2$ to support two-transmit antenna CL1 and CL2 transmit diversity. In this regard, the SWG algorithm block 124 may utilize, for example, similar operations as those for determining phase and amplitude adjustments at the wireless receiver when determining the phase and amplitude adjustments to be applied at a diversity transmitter when either CL1 or CL2 are active.

Figure 1C:
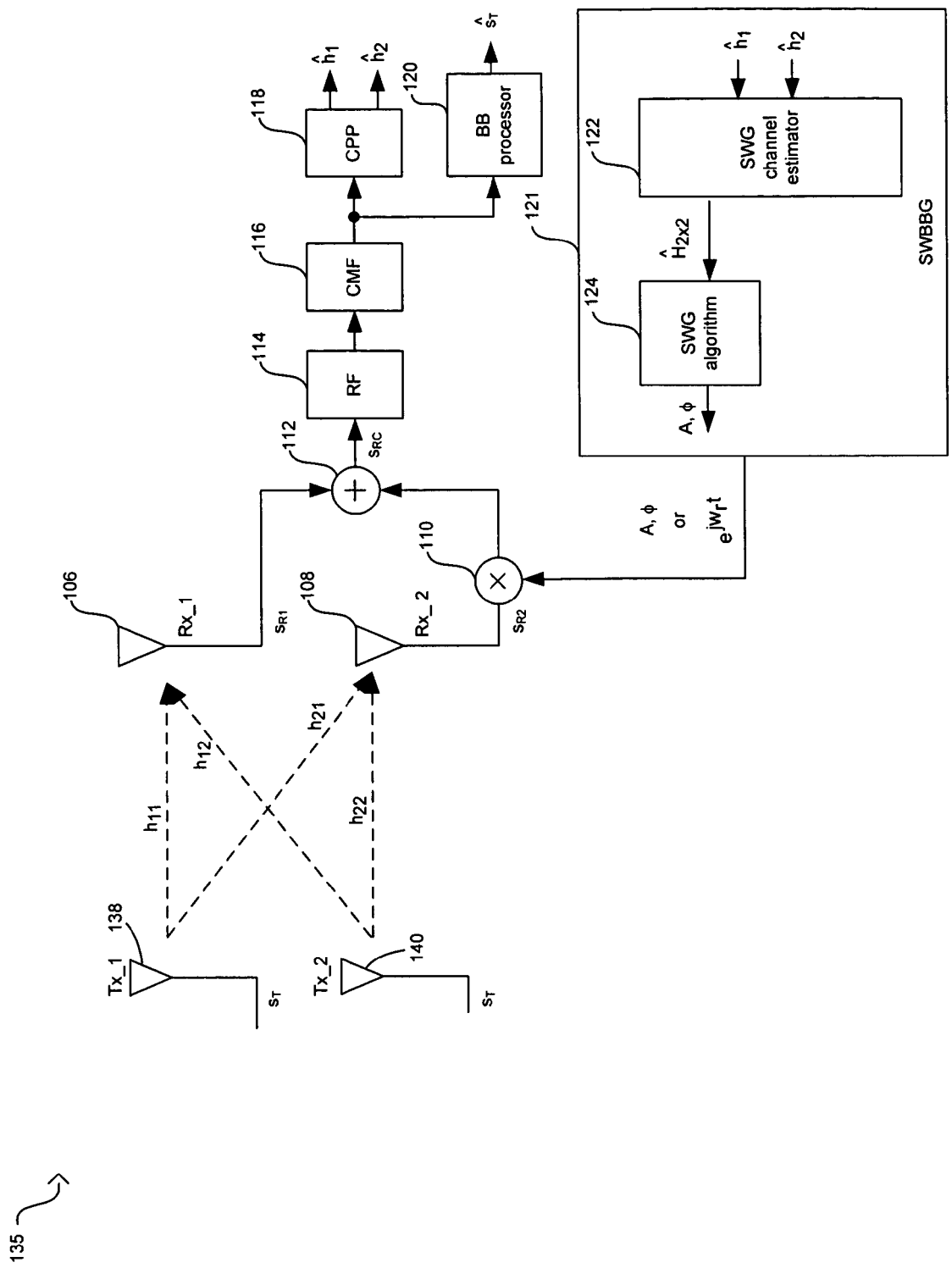
FIG. 1C is a block diagram of an exemplary two-transmit (2-Tx) and two-receive (2-Rx) antennas wireless communication system that supports WCDMA/HSPDA, in accordance with an embodiment of the invention.

FIG. 1C is a block diagram of an exemplary two-transmit (2-Tx) and two-receive (2-Rx) antennas wireless communication system that supports WCDMA/HSPDA, in accordance with an embodiment of the invention. Referring to FIG. 1C, there is shown a wireless communication system 135 that may differ from the wireless communication system 100 in FIG. 1A in that the wireless communication system 135 may comprise chip matching filter (CMF) 116, a cluster path processor (CPP) 118, and a baseband (BB) processor 120.

The CMF 116 may comprise suitable logic, circuitry, and/or code that may be adapted to operate as a matched-filter on the digital output from the RF block 114. The output of the CMF 116 may be transferred, for example, to the CPP 118 and/or to the BB processor 120 for further processing. The CPP 118 may comprise suitable logic, circuitry, and/or code that may be adapted to process the filtered output of the CMF 116 to determine a first baseband combined channel estimate, $\hat{h}_1$, which may comprise information regarding propagation channels $h_{11}$ and $h_{21}$. The CPP 118 may also be adapted to process the filtered output of the CMF 116 to determine a second baseband combined channel estimate, $\hat{h}_2$, which may comprise information regarding propagation channels $h_{12}$ and $h_{22}$. In this regard, the CPP 118 may process the received signals in clusters. U.S. application Ser. No. 11/173,854 provides a detailed description of signal clusters and is hereby incorporated herein by reference in its entirety. The CPP 118 may also be adapted to generate a lock indicator signal that may be utilized by, for example, the BB processor 120 as an indication of whether the channel estimates are valid. The BB processor 120 may comprise suitable logic, circuitry, and/or code that may be adapted to digitally process the filtered output of the CMF 116 to determine an estimate of the transmitted SC communication signals, $\hat{s}_T$.

Figure 1D:
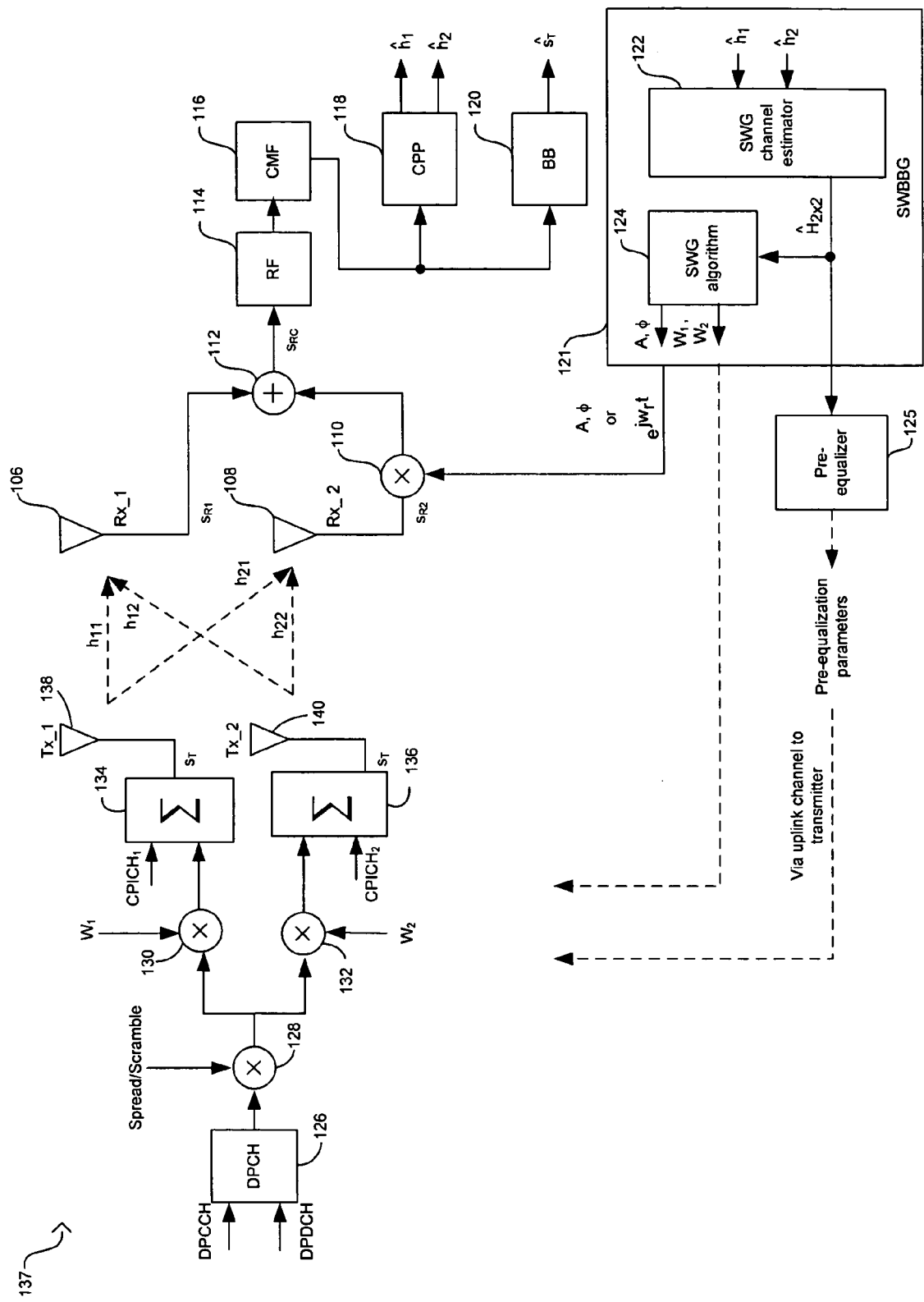
FIG. 1D is a block diagram of an exemplary two-transmit (2-Tx) and two-receive (2-Rx) antennas wireless communication system with pre-equalization that supports WCDMA/HSPDA, in accordance with an embodiment of the invention.

FIG. 1D is a block diagram of an exemplary two-transmit (2-Tx) and two-receive (2-Rx) antennas wireless communication system with pre-equalization that supports WCDMA/HSPDA, in accordance with an embodiment of the invention. Referring to FIG. 1D, there is shown a wireless communication system 137 that may differ from the wireless communication system 135 in FIG. 1C in that the wireless communication system 137 may comprise a dedicated physical channel (DPCH) block 126, a mixer 128, a first combiner 134, a second combiner 136, and the pre-equalizer 125. The pre-equalizer 125 and the SWG algorithm block 124 in FIG. 1D may be adapted to operate substantially as the pre-equalizer 125 and the SWG algorithm block 124 in FIG. 1B.

The DPCH block 126 may comprise suitable logic, circuitry, and/or code that may be adapted to receive a plurality of input channels, for example, a dedicated physical control channel (DPCCH) and a dedicated physical data channel (DPDCH). The DPCH 126 may be adapted to simultaneously control the power on each of the DPCCH and DPDCH channels. The mixer 128 may comprise suitable logic and/or circuitry that may be adapted to multiply the output of DPCH 126 with a spread and/or scramble signal to generate a spread complex-valued signal that may be transferred to the inputs of the mixers 130 and 132.

The output of the mixer 130 may be transferred to the first combiner 134 and the output of the mixer 132 may be transferred to the second combiner 236. The first and second combiners 134 and 136 may comprise suitable logic, circuitry, and/or code that may be adapted to add or combine the outputs generated by mixers 130 and 132 with a common pilot channel 1 (CPICH1) signal and a common pilot channel 2 (CPICH2) signal respectively. The CPICH1 signal and CPICH2 signals may comprise fixed channelization code allocation and may be utilized to measure the signal phase and amplitude and strength of the propagation channels between the transmit antennas and the receive antennas.

Figure 1E:
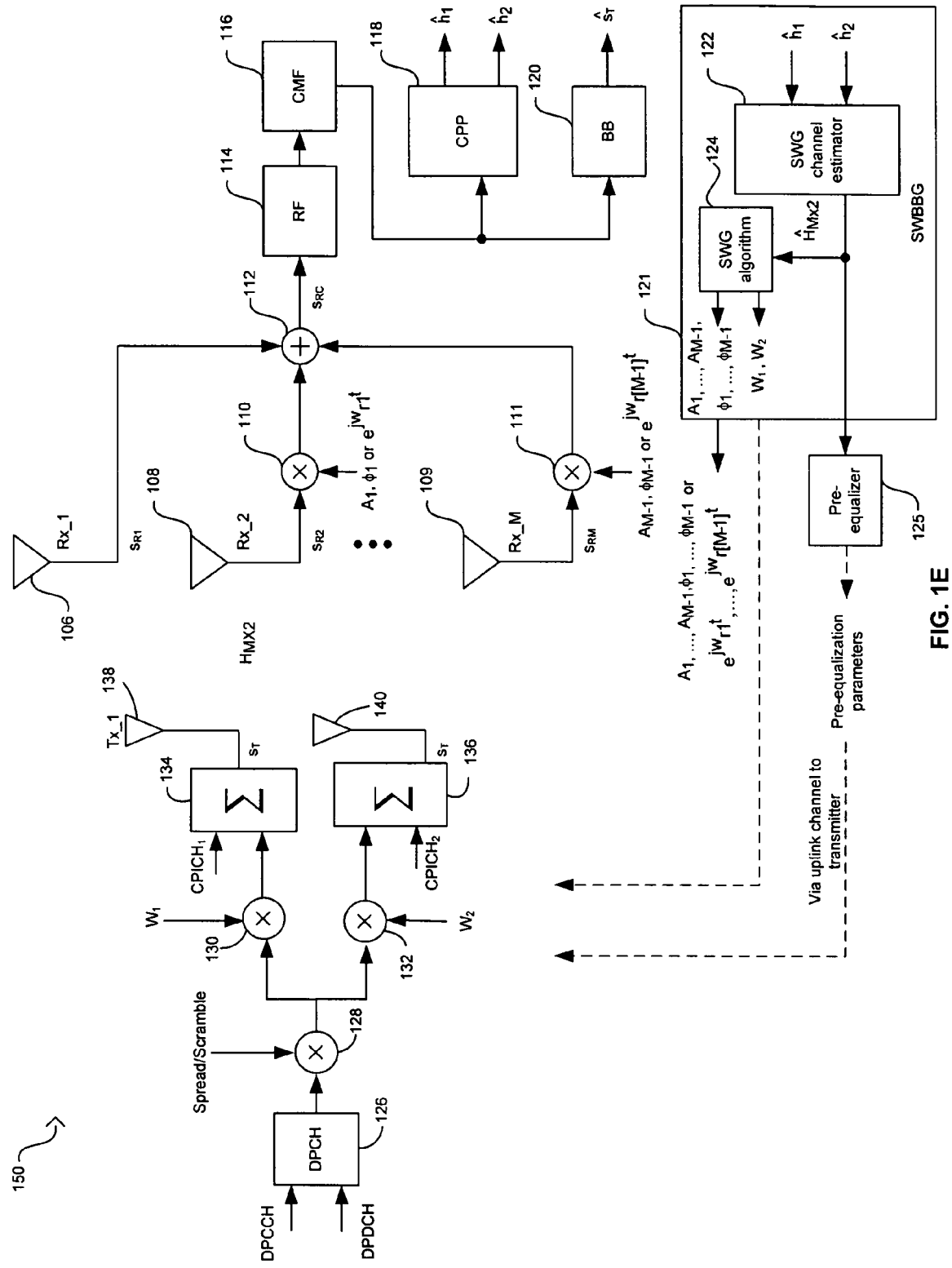
FIG. 1E is a block diagram of an exemplary two-transmit (2-Tx) and multiple-receive (M-Rx) antennas wireless communication system with pre-equalization that supports WCDMA/HSPDA, in accordance with an embodiment of the invention.

FIG. 1E is a block diagram of an exemplary two-transmit (2-Tx) and multiple-receive (M-Rx) antennas wireless communication system with pre-equalization that supports WCDMA/HSPDA, in accordance with an embodiment of the invention. Referring to FIG. 1E, the wireless communication system 150 may differ from the wireless communication system 137 in FIG. 1D in that (M−1) additional receive antennas (Rx_2 108 to Rx_M 109) and (M−1) mixers 110 to 111 may be utilized.

The first transmit antenna, Tx_1 138, and the additional or second transmit antenna, Tx_2 140, may comprise suitable hardware that may be adapted to transmit a plurality of SC communication signals, $s_T$, from a wireless transmitter device. The propagation channels that correspond to the paths taken by the SC communication signals transmitted from the transmit antennas Tx_1 138 and Tx_2 140 and received by the receive antennas Rx_1 106 to Rx_M 109 may be represented by an M×2 matrix, $H_{M\times 2}$. The matrix $H_{M\times 2}$ may comprise propagation channels $h_{11}$ to $h_{M1}$ and $h_{12}$ to $h_{M2}$. In this regard, $h_{11}$ to $h_{M1}$ may represent the time varying impulse responses of the RF paths taken by the portion of the transmitted SC communication signals transmitted by transmit antenna Tx_1 138 and received by the receive antennas Rx_1 106 to Rx_M

109 respectively. Similarly, $h_{12}$ to $h_{M2}$ may represent the time varying impulse responses of the RF paths taken by the portion of the transmitted SC communication signals transmitted by transmit antenna Tx_2 140 and received by the receive antennas Rx_1 106 to Rx_M 109 respectively. In some instances, a wireless transmitter device comprising a first and a second transmit antenna may be adapted to periodically transmit calibration and/or pilot signals that may be utilized by an M-Rx antenna wireless receiver device to determine estimates of $h_{11}$ to $h_{M1}$ and $h_{12}$ to $h_{M2}$. The 2-Tx and M-Rx antennas wireless communication system 150 in FIG. 1B may represent a MIMO communication system.

The CPP 118 in FIG. 1E may be adapted to determine a first baseband combined channel estimate, $\hat{h}_1$, which may comprise information regarding propagation channels $h_{11}$ to $h_{M1}$. For example, a portion of $\hat{h}_1$ may comprise information regarding the propagation channels between the transmit antenna Tx_1 138 and the receive antennas Rx_1 106 and Rx_2 108, that is, $h_{11}$ and $h_{21}$, while another portion of $\hat{h}_1$ may comprise information regarding the propagation channels between the transmit antenna Tx_1 138 and the receive antennas Rx_1 106 and Rx_M 109, that is, $h_{11}$ and $h_{M1}$.

The CPP 118 in FIG. 1E may also be adapted to determine a second baseband combined channel estimate, $\hat{h}_2$, which may comprise information regarding propagation channels $h_{12}$ to $h_{M2}$. For example, a portion of $\hat{h}_2$ may comprise information regarding the propagation channels between the transmit antenna Tx_2 140 and the receive antennas Rx_1 106 and Rx_2 108, that is, $h_{12}$ and $h_{22}$, while another portion of $\hat{h}_2$ may comprise information regarding the propagation channels between the transmit antenna Tx_2 140 and the receive antennas Rx_1 106 and Rx_M 109, that is, $h_{12}$ and $h_{M2}$. The combined channel estimates $\hat{h}_1$ and $\hat{h}_2$ may be determined, that is, may be separated, in the CPP 118 by utilizing the orthogonal relationship between the common pilot signals CPICH1 and CPICH2 transmitted by the antennas Tx_1 138 and Tx_2 140, respectively.

The SWG channel estimator 122 in FIG. 1E may be adapted to process the first and second baseband combined channel estimates, $\hat{h}_1$ and $\hat{h}_2$, determined by the CPP 118 and may determine a matrix $\hat{H}_{M\times 2}$ of propagation channel estimates $\hat{h}_{11}$ to $\hat{h}_{M1}$ and $\hat{h}_{12}$ to $\hat{h}_{M2}$, which correspond to estimates of the matrix $H_{M\times 2}$ of time varying impulse responses $h_{11}$ to $h_{M1}$ and $h_{12}$ to $h_{M2}$, respectively. The SWG algorithm block 124 may utilize the contents of the matrix $\hat{H}_{M\times 2}$ to determine (M−1) channel weights utilized by the mixers 110 to 111 to modify the portions of the transmitted SC communication signals received by the additional receive antennas Rx_2 108 to Rx_M 109 so that the receiver SINR is maximized, for example. The (M−1) channel weights may comprise amplitude and phase components, $A_1$ to $A_{M-1}$ and $\phi_1$ to $\phi_{M-1}$, for example, that result in a maximum receiver SINR. The pre-equalizer 125 in FIG. 1B may be adapted to determine a plurality of pre-equalization parameters based on the matrix $\hat{H}_{M\times 2}$ of propagation channel estimates $\hat{h}_{11}$ to $\hat{h}_{M1}$ and $\hat{h}_{12}$ to $\hat{h}_{M2}$.

Figure 2A:
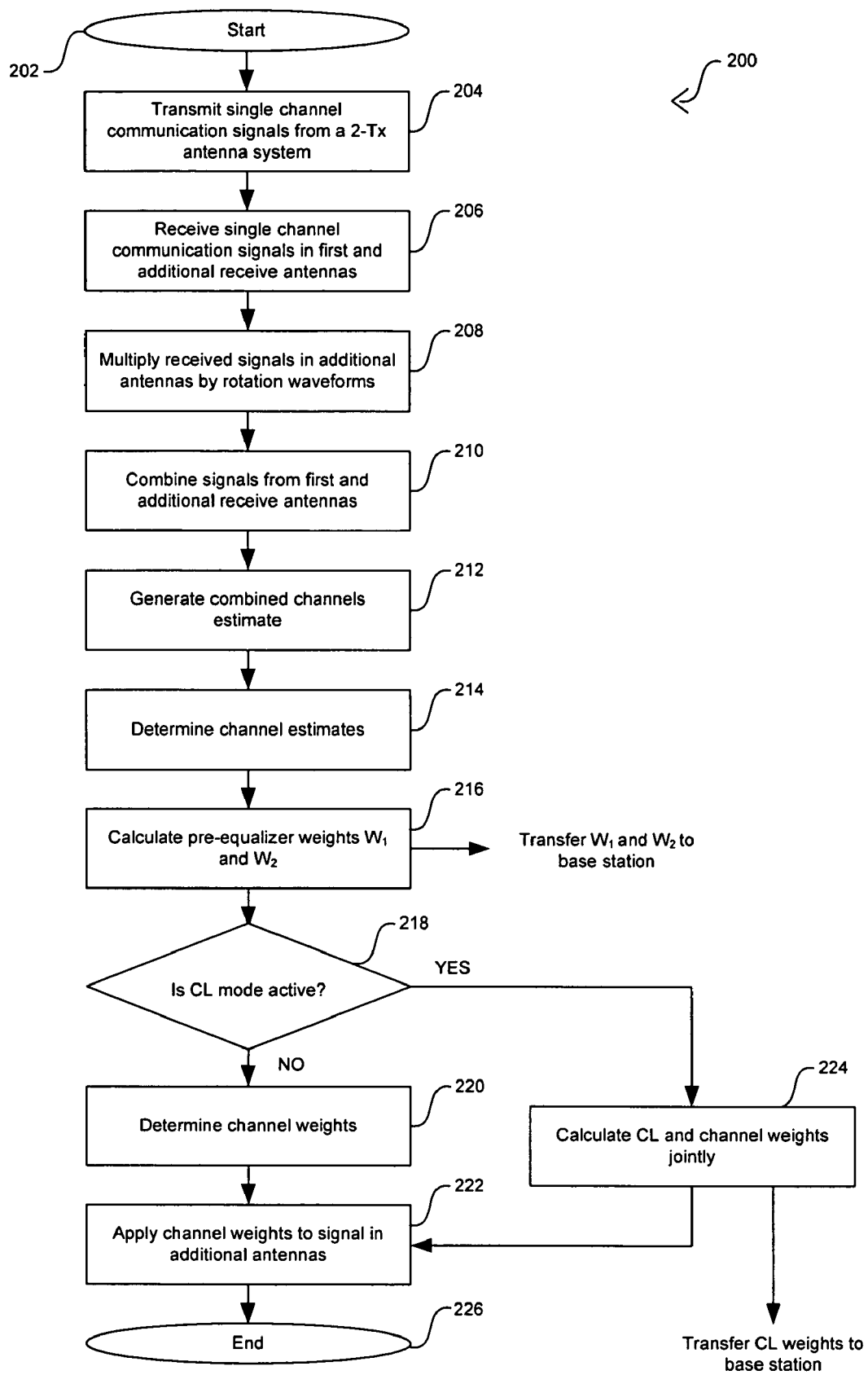
FIG. 2A is a flow diagram illustrating exemplary steps for channel estimation in a 2-Tx and M-Rx antennas wireless communication system, in accordance with an embodiment of the invention.

FIG. 2A is a flow diagram illustrating exemplary steps for channel estimation in a 2-Tx and M-Rx antennas wireless communication system, in accordance with an embodiment of the invention. Referring to FIG. 2A, after start step 202, in step 204, the SC communication signals, $s_T$, may be transmitted from the transmit antennas Tx_1 138 and Tx_2 140 in FIG. 1E. In step 206, the first and additional receive antennas, Rx_1 106 to Rx_M 109, may receive a portion of the transmitted SC communication signals. In step 208, the signals received by the additional receive antennas Rx_1 106 to Rx_M 109 may be multiplied by, for example, rotation waveforms, such as sine, square, or triangular waveforms for example, in the mixers 110 to 111. In this regard, the rotation waveforms may have a given set of phase component values. In step 210, the output of the receive antenna Rx_1 106 and the output of the mixers 110 to 111 associated with the additional receive antennas Rx_2 108 to Rx_M 109 may be added or combined into the received SC communication signal, $s_{RC}$. The combination may occur in the adder 112, for example.

In step 212, the CPP 118 may determine the first and second baseband combined channel estimates, $\hat{h}_1$ and $\hat{h}_2$, which comprise information regarding propagation channels $h_{11}$ to $h_{M1}$ and $h_{12}$ to $h_{M2}$. In step 214, the SWG channel estimator 122 in the SWBBG 121 may determine the matrix $\hat{H}_{M \times 2}$ of propagation channel estimates $\hat{h}_{11}$ to $\hat{h}_{M1}$ and $\hat{h}_{12}$ to $\hat{h}_{M2}$. In this regard, the propagation channel estimates $\hat{h}_{11}$ to $\hat{h}_{M1}$ and $\hat{h}_{12}$ to $\hat{h}_{M2}$ may be determined concurrently. In step 216, the pre-equalizer 125 may calculate or determine the pre-equalization weight parameters or weight factors $W_1$ and $W_2$ that may be applied to the mixers 130 and 132 in FIG. 1E respectively. The pre-equalization weights $W_1$ and $W_2$ may be transferred to a transmitter, such as a base station, to pre-equalize the signals being transmitted from the transmit antennas Tx_1 138 and Tx_2 140.

In step 218, the wireless communication system 150 may determine whether a closed loop operating mode that supports transmit diversity modes CL1 and CL2 is active. When the closed loop operating mode is active, the process may proceed to step 224. In step 224, the (M−1) maximum SINR channel weights that comprise amplitude and phase components, $A_1$ to $A_{M-1}$ and $\phi_1$ to $\phi_{M-1}$, may be generated concurrently with the diversity weight parameters supported by CL1 or CL2. In this regard, the SWG algorithm block 124 may be utilized to generate the amplitude and phase components and the diversity weight parameters $W_1$ and $W_2$. The channel weights may be based on the propagation channel estimates determined after the application of pre-equalization weight parameters $W_1$ and $W_2$ to the transmitter. The diversity weight parameters supported by CL1 or CL2 may be transferred to a transmitter, such as a base station, to combine the signals being transmitted from the transmit antennas Tx_1 138 and Tx_2 140. After step 224, the process may proceed to step 222.

Returning to step 218, when the closed loop operating mode is not active, the process may proceed to step 220. In step 220, the SWG algorithm block 124 may generate the (M−1) maximum SINR channel weights that comprise amplitude and phase components, $A_1$ to $A_{M-1}$ and $\phi_1$ to $\phi_{M-1}$. In step 222, the (M−1) maximum SINR channel weights may be applied to the mixers 110 to 111 in FIG. 1E.

Figure 2B:
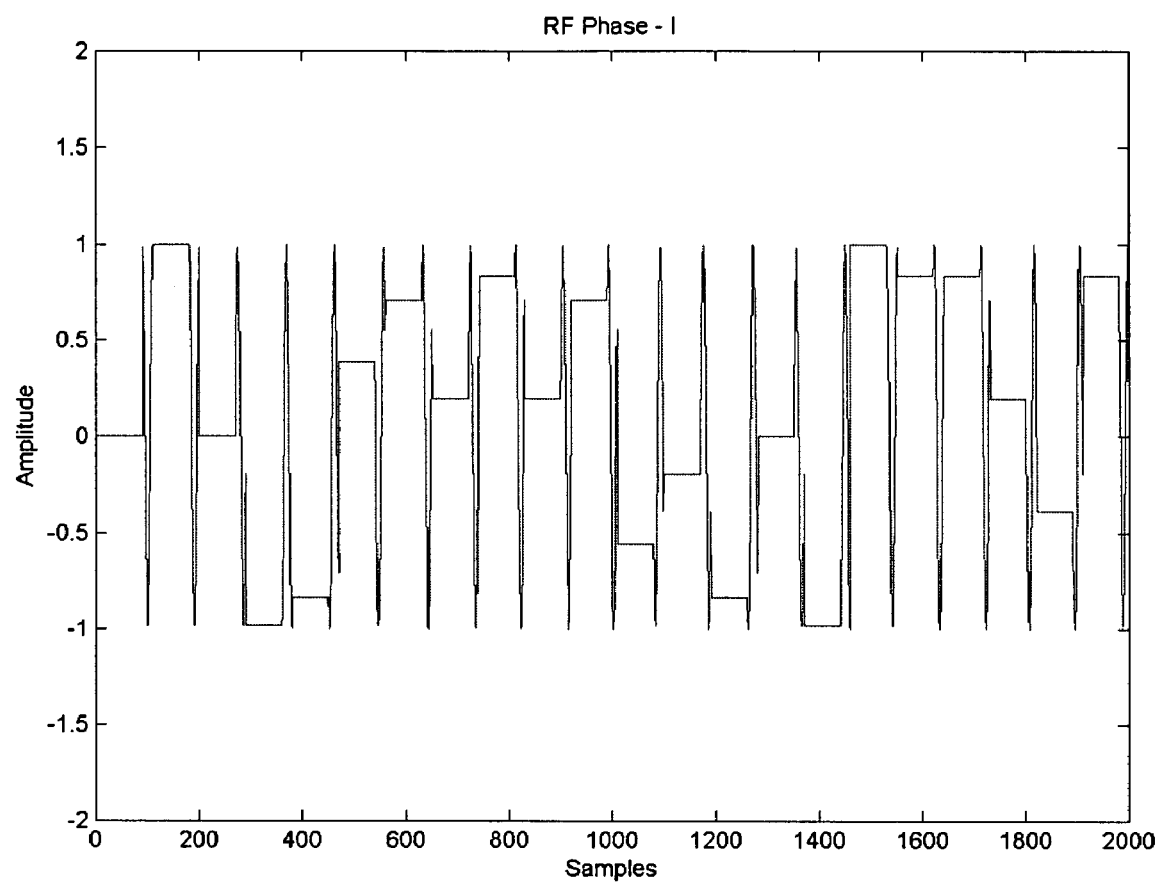
FIG. 2B illustrates an exemplary periodic phase rotation for an in-phase (I) signal received in one of the additional receive antennas, in accordance with an embodiment of the invention.

After steps 222 or 224, the process may proceed to end step 226 where additional SC communication signals received may be phase and amplitude adjusted based on the maximum SINR channel weights applied to the mixers 110 to 111. The channel estimation phase rotation and the maximum SINR phase/amplitude adjustment described in flow chart 200 may be performed continuously or may be performed periodically. In this regard, FIG. 2B illustrates an exemplary periodic phase rotation for an in-phase (I) signal received in one of the additional receive antennas, in accordance with an embodiment of the invention.

Figure 3A:
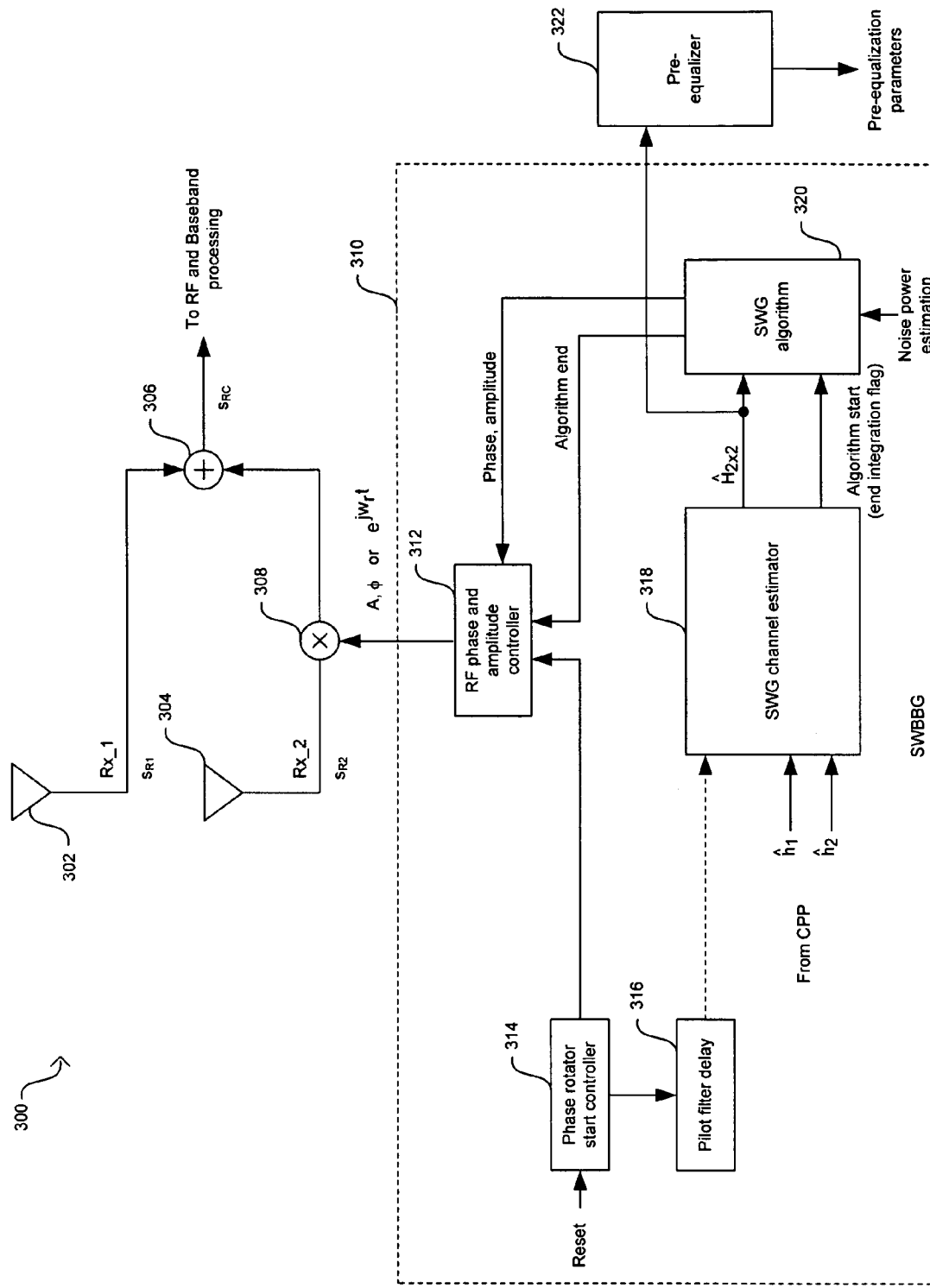
FIG. 3A is a block diagram of an exemplary single weight baseband generator (SWBBG) that may be utilized in a 2-Tx and 2-Rx antennas system, in accordance with an embodiment of the invention.

FIG. 3A is a block diagram of an exemplary single weight baseband generator (SWBBG) that may be utilized in a 2-Tx and 2-Rx antennas system, in accordance with an embodiment of the invention. Referring to FIG. 3A, a receiver system 300 may correspond to a portion of the wireless communication system 137 in FIG. 1D and may comprise a first receive antenna (Rx_1) 302, an additional receive antenna (Rx_2) 304, an adder 306, a mixer 308, a single weight baseband generator (SWBBG) 310, and a pre-equalizer 322. The SWBBG 310 may comprise a phase rotator start controller 314, a delay block 316, a single weight generator (SWG) channel estimator 318, an SWG algorithm block 320, and an RF phase and amplitude controller 312. The SWBBG 310 may represent an exemplary implementation of the SWBBG 121 in FIG. 1D.

The first receive antenna, Rx_1 302, and the additional or second receive antenna, Rx_2 304, may comprise suitable hardware that may be adapted to receive at least a portion of transmitted SC communication signals in the receiver system 300. For example, the receive antenna Rx_1 302 may receive a signal $s_{R1}$ while the receive antenna Rx_2 304 may receive a signal $s_{R2}$. The mixer 308 may correspond to, for example, the mixer 110 in FIG. 1D. In some instances, the output of the mixer 308 may be communicated to a bandpass filter and/or a low noise amplifier (LNA) for further processing of the received signals.

The adder 306 may comprise suitable hardware, logic, and/or circuitry that may be adapted to add the output of the receive antenna Rx_1 302 and the output of the mixer 308 to generate a combined received SC communication signal, $s_{RC}$. In some instances, bringing the output signals of the receive antenna Rx_1 302 and the mixer 308 together into a single electrical connection may provide the functionality of the adder 306. The output of the adder 306 may be transferred to additional processing blocks for RF and baseband processing of the combined received SC communication signal, $s_{RC}$.

The phase rotator and start controller 314 may comprise suitable logic, circuitry, and/or code that may be adapted to control portions of the operation of the RF phase and amplitude controller 312 and to control the delay block 316. The phase rotator and start controller 314 may receive a signal, such as a reset signal, from, for example, the BB processor 120 in FIG. 1D, or from firmware operating in a processor, to indicate the start of operations that determine the propagation channel estimates and/or the channel weight to apply to the mixer 308. The delay block 316 may comprise suitable logic, circuitry, and/or code that may be adapted to provide a time delay to compensate for the RF/modem delay. The delay may be applied in order to compensate for the interval of time that may occur between receiving the combined channel estimates, $\hat{h}_1$ and $\hat{h}_2$, modified by the rotation waveform and the actual rotating waveform at the mixer 308.

The SWG channel estimator 318 may comprise suitable logic, circuitry, and/or code that may be adapted to process the first and second baseband combined channel estimates, $\hat{h}_1$ and $\hat{h}_2$, and determine the matrix $\hat{H}_{2 \times 2}$ of propagation channel estimates $\hat{h}_{11}$, $\hat{h}_{12}$, $\hat{h}_{21}$, and $\hat{h}_{22}$. The SWG channel estimator 318 may also be adapted to generate an algorithm start signal to the SWG algorithm block 320 to indicate that the propagation channel estimates $\hat{h}_{11}$, $\hat{h}_{12}$, $\hat{h}_{21}$, and $\hat{h}_{22}$ are available for processing. In this regard, the algorithm start signal may be asserted when integration operations performed by the SWG channel estimator 318 have completed.

The SWG algorithm block 320 may comprise suitable logic, circuitry, and/or code that may be adapted to determine a channel weight to be transferred to the mixer 308 via the RF phase and amplitude controller 312 to modify the signal $s_{R2}$. The channel weight to be transferred to the mixer 308 may refer to the phase, $\phi$, and amplitude, A. The channel weight may be based on the propagation channel estimates $\hat{h}_{11}$, $\hat{h}_{12}$, $\hat{h}_{21}$, and $\hat{h}_{22}$ and on additional information such as noise power estimates and interference propagation channel estimates, for example. The SWG algorithm block 320 may also be adapted to generate an algorithm end signal to indicate to the RF phase and amplitude controller 312 that the channel weight has been determined and that it may be applied to the mixer 308.

The SWG algorithm block 320 may also be adapted to generate a portion of the weight parameters or weight factors $W_1$ and $W_2$ related to the closed loop diversity operation. The channel weights and closed loop diversity weights may be calculated jointly to maximize the receiver SINR, for example. The pre-equalizer 322 may comprise suitable logic, circuitry, and/or code that may be adapted to determine a plurality of pre-equalization parameters based on the matrix $\hat{H}_{2\times2}$ of propagation channel estimates $\hat{h}_{11}$, $\hat{h}_{12}$, $\hat{h}_{21}$, and $\hat{h}_{22}$. The pre-equalizer 322 may also be adapted to generate a portion of the weight parameters or weight factors $W_1$ and $W_2$. In this regard, the pre-equalizer 322 may generate the weight factors $W_1$ and $W_2$ when the closed loop operating mode is not active, while the SWG algorithm block 320 may generated the weight factors $W_1$ and $W_2$ when the closed loop operating mode is active, for example.

The RF phase and amplitude controller 312 may comprise suitable logic, circuitry, and/or code that may be adapted to apply the rotation waveform $e^{jw_r t}$ to the mixer 308. When phase and amplitude components, A and $\phi$, that correspond to the channel weight determined by the SWG algorithm block 320 are available, the RF phase and amplitude controller 312 may apply amplitude A and phase $\phi$ to the mixer 308. In this regard, the RF phase and amplitude controller 312 may apply the rotation waveform or the amplitude and phase components in accordance with the control signals provided by the phase rotator start controller 314 and/or the algorithm end signal generated by the SWG algorithm block 320.

The phase rotation operation performed on the $s_{R2}$ signal in the additional receive antenna Rx_2 304 may be continuous or periodic. A continuous rotation of the $s_{R2}$ signal may be perceived by a wireless modem as a high Doppler, and for some modem implementations this may decrease the modem's performance. When a periodic rotation operation is utilized instead, the period between consecutive phase rotations may depend on the Doppler frequency perceived by the wireless modem. For example, in a higher Doppler operation, it may be necessary to perform more frequent channel estimation while in a lower Doppler operation, channel estimation may be less frequent. The signal rotation period may also depend on the desired wireless modem performance and the accuracy of the propagation channel estimation. For example, when the Doppler frequency is 5 Hz, the period between consecutive rotations may be $\frac{1}{50}$ sec., that is, 10 rotations or channel estimations per signal fade.

Figure 3B:
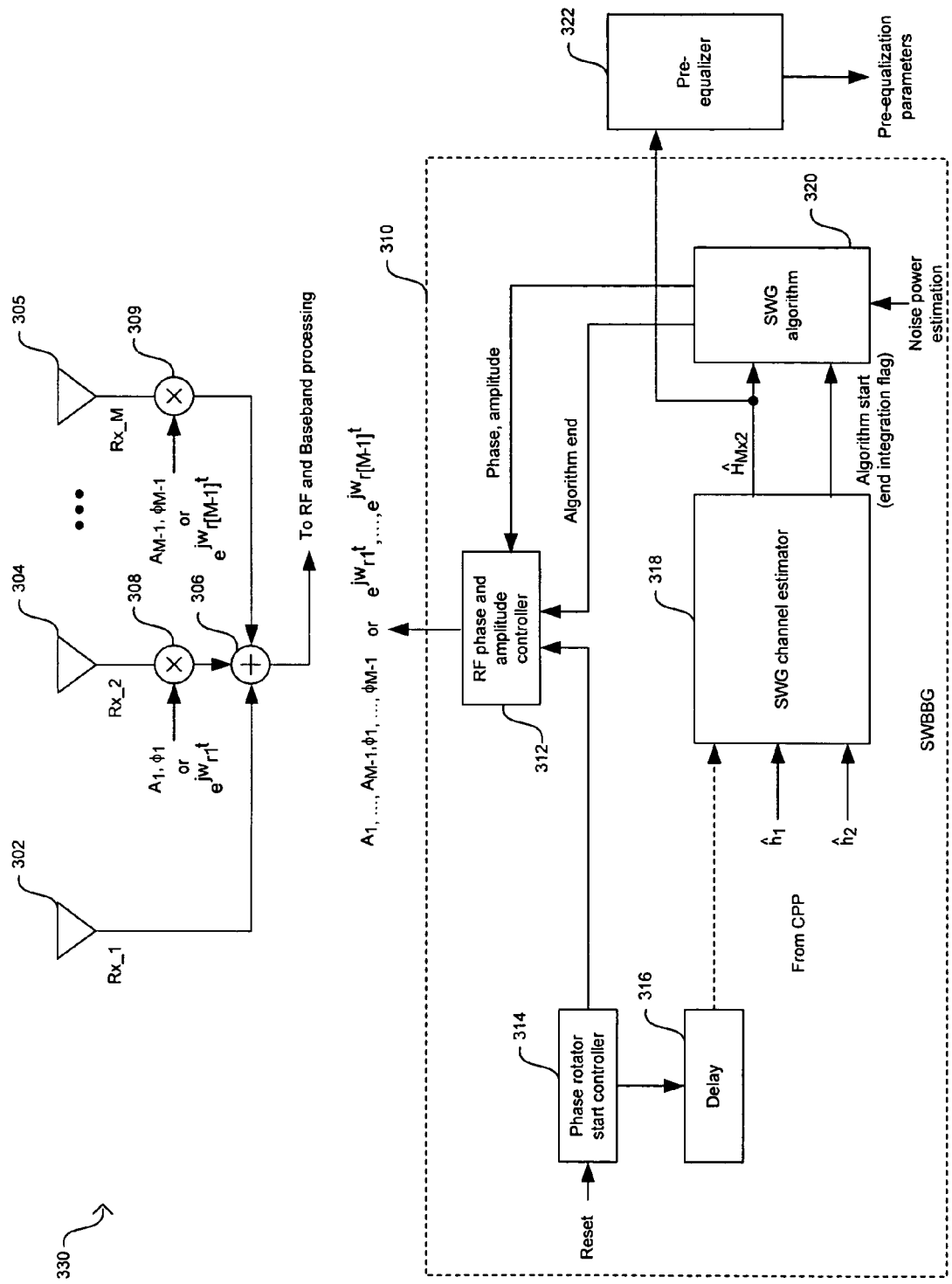
FIG. 3B is a block diagram of an exemplary single weight baseband generator (SWBBG) that may be utilized for channel pre-equalization in a 2-Tx and M-Rx antennas system, in accordance with an embodiment of the invention.

FIG. 3B is a block diagram of an exemplary single weight baseband generator (SWBBG) that may be utilized in a 2-Tx and M-Rx antennas system, in accordance with an embodiment of the invention. Referring to FIG. 3B, a receiver system 330 may correspond to a portion of the wireless communication system 150 in FIG. 1E and may differ from the receiver system 300 in FIG. 3A in that (M−1) additional receive antennas, Rx_2 304 to Rx_M 305, and (M−1) mixers 308 to 309 may be utilized. In this regard, the SWG channel estimator 318 may be adapted to process the first and second baseband combined channel estimates, $\hat{h}_1$ and $\hat{h}_2$, and determine the matrix $\hat{H}_{M\times2}$ of propagation channel estimates $\hat{h}_{11}$ to $\hat{h}_{M1}$ and $\hat{h}_{12}$ to $\hat{h}_{M2}$.

The SWG algorithm block 320 may also be adapted to determine (M−1) channel weights, that may be utilized to maximize receiver SINR, for example, to be applied to the mixers 308 to 309 to modify the portions of the transmitted SC communication signals received by the additional receive antennas Rx_2 304 to Rx_M 305. The (M−1) channel weights may comprise amplitude and phase components, $A_1$ to $A_{M-1}$ and $\phi_1$ to $\phi_{M-1}$. The RF phase and amplitude controller 312 may also be adapted to apply rotation waveforms $e^{jw_{r1}t}$ to $e^{jw_{r(M-1)}t}$ or phase and amplitude components, $A_1$ to $A_{M-1}$ and $\phi_1$ to $\phi_{M-1}$, to the mixers 308 to 309. In this regard, the RF phase and amplitude controller 312 may apply the rotation waveforms or the amplitude and phase components in accordance with the control signals provided by the phase rotator start controller 314 and/or the algorithm end signal generated by the SWG algorithm block 320. The SWG algorithm block 320 may also be adapted to generate a portion of the weight parameters or weight factors $W_1$ and $W_2$ related to the closed loop diversity operation. The channel weights and closed loop diversity weights may be calculated jointly to maximize the receiver SINR, for example. The pre-equalizer 322 in FIG. 3B may also be adapted to determine a plurality of pre-equalization parameters based on the matrix $\hat{H}_{M\times2}$ of propagation channel estimates $\hat{h}_{11}$ to $\hat{h}_{M1}$ and $\hat{h}_{12}$ to $\hat{h}_{M2}$.

Figure 3C:
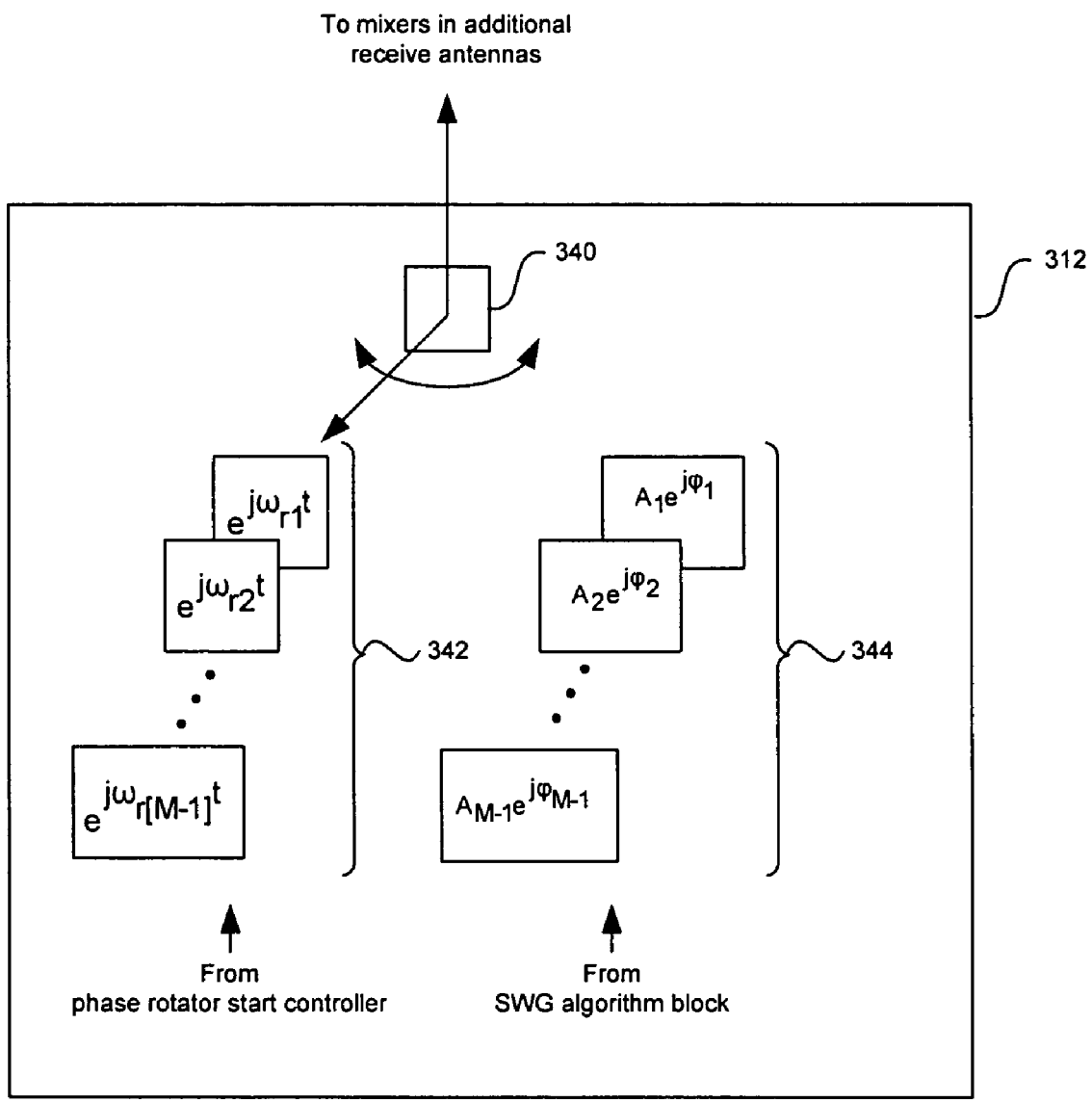
FIG. 3C is a block diagram of an exemplary RF phase and amplitude controller, in accordance with an embodiment of the invention.

FIG. 3C is a block diagram of an exemplary RF phase and amplitude controller, in accordance with an embodiment of the invention. Referring to FIG. 3C, the RF phase and amplitude controller 312 may comprise a switch 340, a plurality of rotation waveform sources 342, and a plurality of SWG algorithm weights 344. The switch 340 may comprise suitable hardware, logic, and/or circuitry that may be adapted to select between the rotation waveforms $e^{jw_{r1}t}$ to $e^{jw_{r(M-1)}t}$ and the SWG algorithm determined weights $A_1 e^{j\Phi_1}$ to $A_{M-1} e^{j\Phi_{M-1}}$. The rotation waveform sources 342 may comprise suitable hardware, logic and/or circuitry that may be adapted to generate the signal $e^{jw_{rk}t}$, where $w_{rk}=2\pi f_{rk}$ and $f_{rk}$ is the rotation frequency that preserves the orthogonality of the received signals at the receive antennas Rx_2 302 to Rx_M 305 in FIG. 3B, for example. The rotation frequency that preserves the signal orthogonality at the receiving antennas may be selected as $w_{rk}=kw_r$ where k=1, 2, . . . , M−1. Other rotation waveforms such as triangular or square waveforms may be utilized with the same frequency relationships. Moreover, waveforms representing different orthogonal codes of the same frequency may also be utilized, similar to the CDMA orthogonal codes with the same spreading. In this embodiment, the signal $e^{jw_{rk}t}$ may be utilized as an exemplary waveform. The plurality of SWG algorithm weights 344 may comprise suitable hardware, logic, and/or circuitry that may be adapted to generate the signals $A_1 e^{j\Phi_1}$ to $A_{M-1} e^{j\Phi_{M-1}}$ from the amplitude and phase components, $A_1$ to $A_{M-1}$ and $\phi_1$ to $\phi_{M-1}$, respectively.

In operation, the RF phase and amplitude controller 312 may apply the signals $e^{jw_{r1}t}$ to $e^{jw_{r(M-1)}t}$ to the mixers 308 to 309 in FIG. 3B based on control information provided by the phase rotator start controller 314. The switch 340 may select the rotation waveform sources 342 based on the control information provided by the phase rotator start controller 314. Once the channel weights are determined by the SWG algorithm block 320 and the phase and amplitude components have been transferred to the RF phase and amplitude controller 312, the algorithm end signal may be utilized to change the selection of the switch 340. In this regard, the switch 340 may be utilized to select and apply the signals $A_1 e^{j\Phi_1}$ to $A_{M-1} e^{j\Phi_{M-1}}$ to the mixers 308 to 309 in FIG. 3B.

Figure 4:
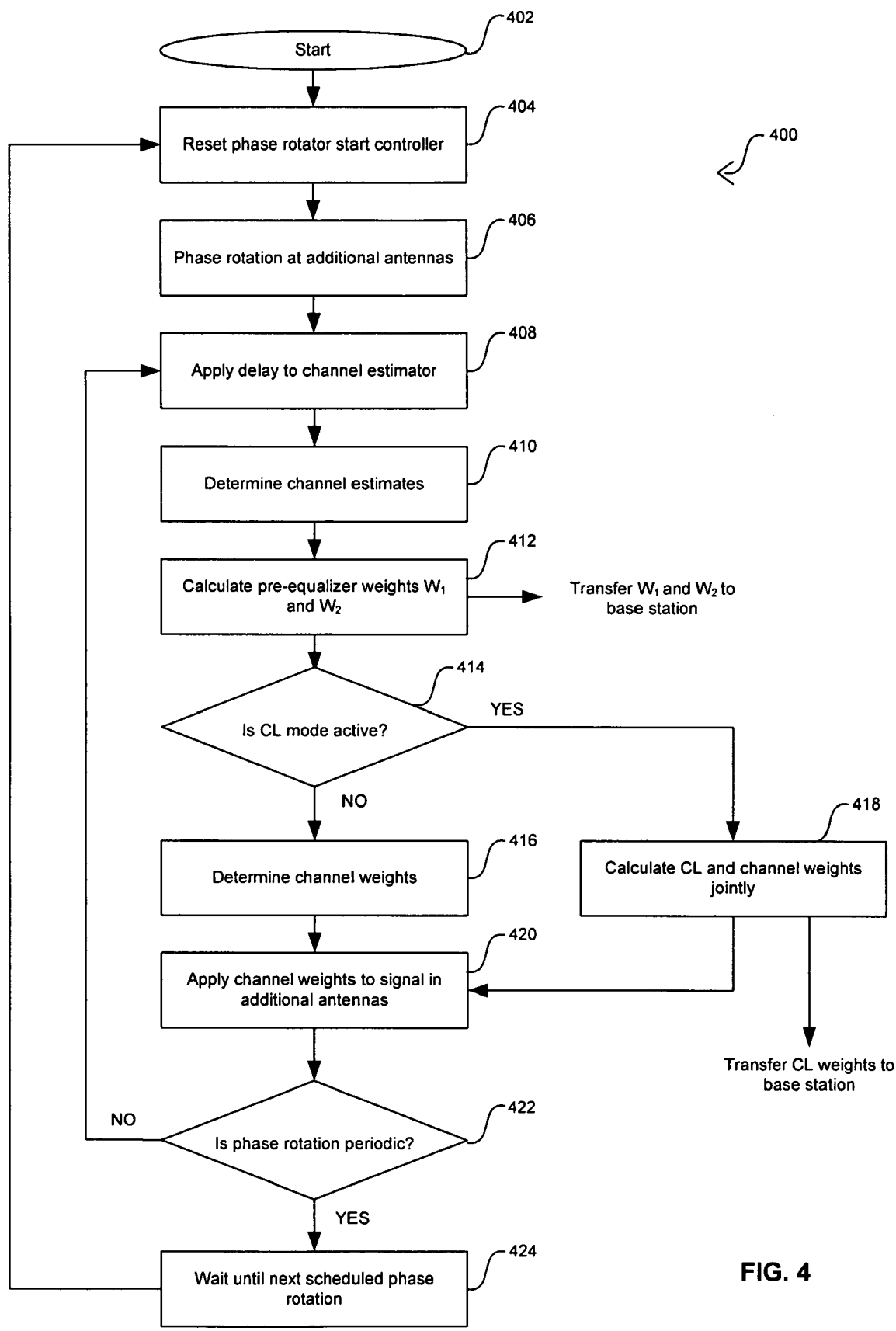
FIG. 4 is a flow diagram illustrating exemplary steps in the operation of the single weight baseband generator (SWBBG) that may be utilized in a 2-Tx and M-Rx antennas system, in accordance with an embodiment of the invention.

FIG. 4 is a flow diagram illustrating exemplary steps in the operation of the single weight baseband generator (SWBBG) that may be utilized in a 2-Tx and M-Rx antennas system, in accordance with an embodiment of the invention. Referring to FIG. 4, after start step 402, in step 404, the phase rotator start controller 314 in FIG. 3B may receive the reset signal to initiate operations for determining propagation channel estimates and channel weights in the SWBBG 310. The phase rotator start controller 314 may generate control signals to the delay block 316 and to the RF phase and amplitude controller 312. The control signals to the delay block 316 may be utilized to determine a delay time to be applied by the delay block 316. The control signals to the RF phase and amplitude controller 312 may be utilized to determine when to apply the rotation waveforms or the channel weights determined by the SWG algorithm block 124 to the mixers 308 to 309 in FIG. 3B, for example.

In step 406, the RF phase and amplitude controller 312 may apply the signals $e^{jw_r{_1}t}$ to $e^{jw_{r(M-1)}t}$ to the mixers 308 to 309 in FIG. 3B. In step 408, the delay block 316 may apply a time delay signal to the SWG channel estimator 318 to reflect the interval of time that may occur between receiving the combined channel estimates, $\hat{\underline{h}}_1$ and $\hat{\underline{h}}_2$, modified by the rotation waveform and the actual rotating waveform at the mixer 308. For example, the time delay signal may be utilized as an enable signal to the SWG channel estimator 318, where the assertion of the time delay signal initiates operations for determining propagation channel estimates. In step 410, the SWG channel estimator 318 may process the first and second baseband combined channel estimates, $\hat{h}_1$ and $\hat{h}_2$, and may determine the matrix $\hat{H}_{M\times 2}$ of propagation channel estimates $\hat{h}_{11}$ to $\hat{h}_{M1}$ and $\hat{h}_{12}$ to $\hat{h}_{M2}$. The SWG channel estimator 318 may transfer the propagation channel estimates $\hat{h}_{11}$ to $\hat{h}_{M1}$ and $\hat{h}_{12}$ to $\hat{h}_{M2}$ to the SWG algorithm block 320. In step 412, the pre-equalizer 322 may calculate or generate the pre-equalization weight parameters or weight factors $W_1$ and $W_2$. The pre-equalization weight parameters may be transferred to a wireless transmitter, such as a base station.

In step 414, the receiver system 330 in FIG. 3B may determine whether a closed loop operating mode that supports transmit diversity modes CL1 and CL2 is active. When the closed loop operating mode is active, the process may proceed to step 418. In step 418, the (M−1) maximum SINR channel weights that comprise amplitude and phase components, $A_1$ to $A_{M-1}$ and $\phi_1$ to $\phi_{M-1}$, may be generated by the SWG algorithm block 320 concurrently with the diversity weight parameters $W_1$ and $W_2$ supported by CL1 or CL2. The channel weights may be based on the propagation channel estimates determined after the application of pre-equalization weight parameters $W_1$ and $W_2$ to the transmitter. The diversity weight parameters that support CL1 or CL2 may be transferred to a transmitter, such as a base station, to apply the weights to the signals being transmitted. After step 418, the process may proceed to step 420.

Returning to step 414, when the closed loop operating mode is not active, the process may proceed to step 416. In step 416, the SWG algorithm block 320 may generate the (M−1) maximum SINR channel weights that comprise amplitude and phase components, $A_1$ to $A_{M-1}$ and $\phi_1$ to $\phi_{M-1}$, based on the propagation channel estimates $\hat{h}_{11}$ to $\hat{h}_{M1}$ and $\hat{h}_{12}$ to $\hat{h}_{M2}$ and/or noise power estimates and interference channel estimates, for example. The SWG algorithm block 320 may transfer the channel weights to the RF phase and amplitude controller 312. The SWG algorithm block 320 may generate the algorithm end signal to indicate to the RF phase and amplitude controller 312 that the channel weights are available to be applied to the mixers 308 to 309. In step 420, RF phase and amplitude controller 312 may apply the maximum SINR weights with phase and amplitude components, $A_1$ to $A_{M-1}$ and $\phi_1$ to $\phi_{M-1}$, to the mixers 308 to 309 in FIG. 3B, in accordance with the control signals provided by the phase rotator start controller 314 and/or the SWG algorithm block 320.

In step 422, the receiver system 330 in FIG. 3B may determine whether the phase rotation operation on the received SC communication signals is periodic. When the phase rotation operation is not periodic but continuous, the process may proceed to step 408 where a new delay may be applied to the SWG channel estimator 318. In instances when the phase rotation operation is periodic, the process may proceed to step 424 where the receiver system 330 may wait until the next phase rotation operation is initiated by the reset signal. In this regard, the process may return to step 404 upon assertion of the reset signal on the phase rotator start controller 314.

Figure 5:
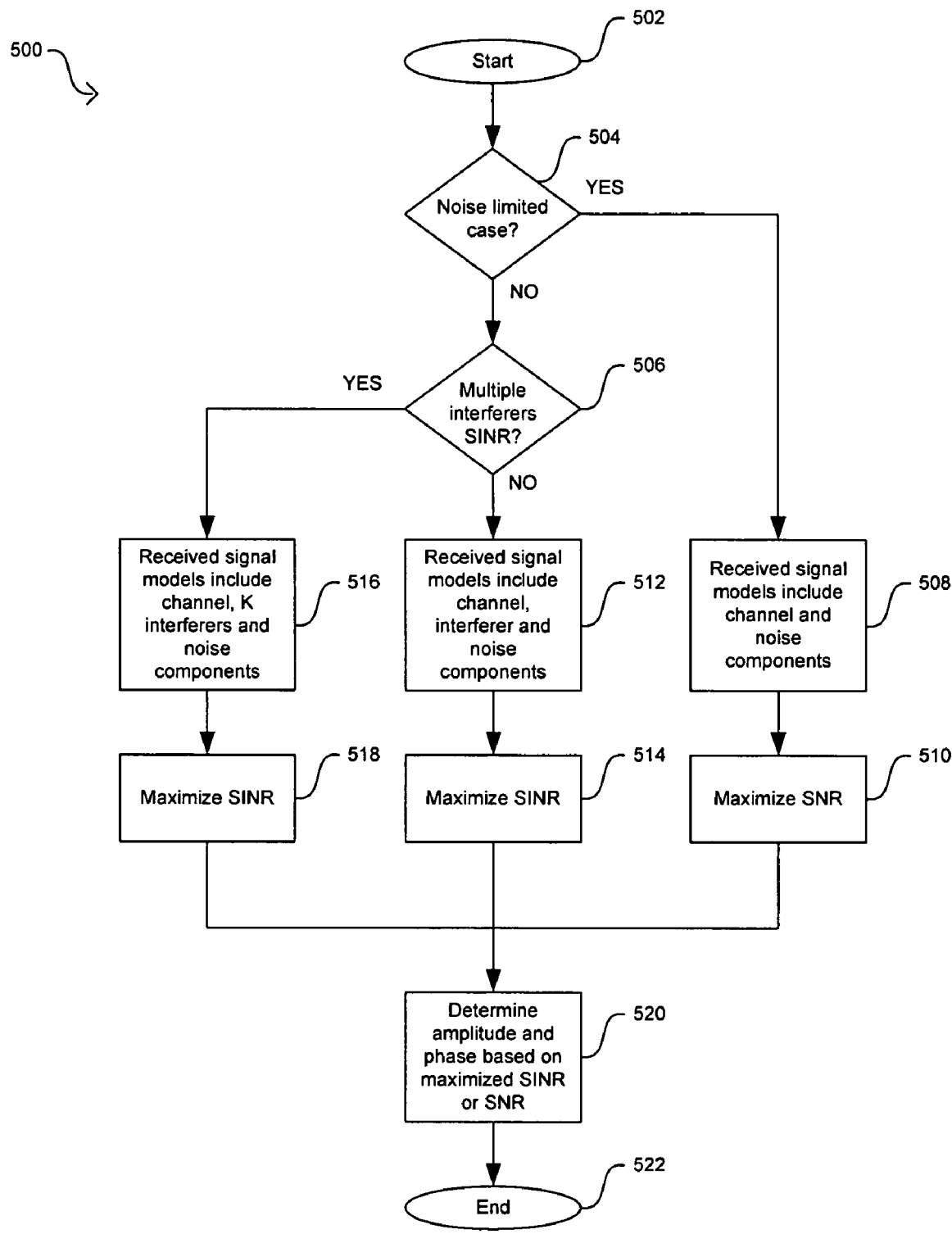
FIG. 5 is a flow diagram illustrating exemplary steps for determining channel weights in additional receive antennas utilizing signal-to-noise ratio (SNR) or signal-to-interference-and-noise ratio (SINR), in accordance with an embodiment of the invention.

FIG. 5 is a flow diagram illustrating exemplary steps for determining channel weights in additional receive antennas utilizing signal-to-noise ratio (SNR) or signal-to-interference-and-noise ratio (SINR), in accordance with an embodiment of the invention. Referring to FIG. 5, after start step 502, in step 504, the SWG algorithm block 320 may determine whether the signals received in the receive antennas are noise limited. The SWG algorithm block 320 may receive noise statistics and/or other noise information from either the CPP 118 and/or from the BB processor 120. When the received signals are noise limited, the flow diagram control may proceed to step 508. In step 508, the SWG algorithm block 320 may generate models for the received signals. For example, the models for a 1-Tx and 2-Rx antennas system may be represented by the following expressions:

$$r_1 = h_1 s + n_1,$$

$$r_2 = Ae^{j\theta}h_2 s + Ae^{j\theta}n_2, \text{ and}$$

$$y = r_1 + r_2 = s(h_1 + Ae^{j\theta}h_2) + n_1 + Ae^{j\theta}n_2,$$

where $r_1$ may represent a model of the signal received in a first receive antenna, $r_2$ may represent a model of the signal received in the second receive antenna, s may represent the transmitted signal, and $n_1$ may represent a noise component at the first receive antenna, whose time varying impulse response is represented by $h_1$. The parameter $n_2$ may represent a noise component at the second receive antenna, whose time varying impulse response is represented by $h_2$, $\theta$ may represent the phase factor between the signal received in the first and second receive antennas, and A may represent an amplitude factor. The parameter y may represent the sum of the received signal models and may comprise a combined signal component $s(h_1 + Ae^{j\theta}h_2)$ and a combined noise component $n_1 + Ae^{j\theta}n_2$.

In step 510, the received signal models may be utilized to determine a signal strength parameter. In this regard, the signal-to-noise ratio (SNR) may correspond to the signal strength parameter to be determined. For example, for a 1-Tx and 2-Rx antennas system, the SNR may be determined by maximizing the following expression for various phase, $\theta$, and amplitude, A, factors:

$$SNR = \frac{\|h_1 + Ae^{j\theta}h_2\|^2}{E\|n_1\|^2 + E\|Ae^{j\theta}n_2\|^2}$$

$$= \frac{\|h_1 + Ae^{j\theta}h_2\|^2}{\sigma^2(1 + A^2)}.$$

The SNR numerator may correspond to the y parameter's combined signal component while the SNR denominator may correspond to the y parameter's combined noise component. The phase factor, $\theta$, may be selected, for example, from a 360-degrees phase rotation while the amplitude factor, A, may be selected, for example, from an set amplitude range. In one embodiment of the invention, the phase factor may be varied in a plurality of phase factor steps over the 360-degrees phase rotation to find the maximum SNR value. In another embodiment of the invention, the phase factor may be varied in a plurality of phase factors steps over the 360-degrees phase rotation and the amplitude factor may be varied in a plurality of amplitude factor values over the amplitude range to find the maximum SNR value.

In step 520, after determining the maximum SNR in step 510, the SWG algorithm block 320 may utilize the amplitude factor and phase factor that corresponds to the maximum SNR to determine the amplitude and phase to be provided to the RF amplitude and phase controller 312 in step 520. For example, in one embodiment of the invention, the amplitude and/or phase factors that correspond to the maximum SNR may be utilized as the amplitude and phase to be transferred to the RF amplitude and phase controller 312. After application of the appropriate amplitude and phase by the RF amplitude and phase controller 312 to the receive antennas, the flow diagram control may proceed to end step 522 until a next phase and amplitude determination is necessary.

Returning to step 504, when received signals are not noise limited, the flow control may proceed to step 506 where a determination may be made as to whether multiple interfering signals may be present and may need to be considered during channel weight determination. When a single interferer is considered, the flow diagram control may proceed to step 512. In step 512 the SWG algorithm block 320 may generate models for the received signals. For example, the models for a 1-Tx and 2-Rx antennas system may be represented by the following expressions:

$$r_1 = h_1 s + h_{I1} s_I + n_1,$$

$$r_2 = Ae^{j\theta}(h_2 s + h_{I2} s_I + n_2), \text{ and}$$

$$y = r_1 + r_2 = s(h_1 + Ae^{j\theta} h_2) + n_1 + s_I(h_{I1} + Ae^{j\theta} h_{I2}) + Ae^{j\theta} n_2,$$

where $r_1$ may represent a model of the signal received in a first receive antenna, $r_2$ may represent a model of the signal received in the second receive antenna, s may represent the transmitted signal, $s_I$ may represent the interference signal, and $n_1$ may represent a noise component at the first receive antenna whose time varying impulse response is $h_1$. The parameter $n_2$ may represent a noise component at the second receive antenna whose time varying impulse response is $h_2$, $\theta$ may represent the phase factor between the signal received in the first and second receive antennas, and A may represent an amplitude factor. Moreover, the time varying impulse response $h_{I1}$ may correspond to the propagation channel between the interference signal source and the first receive antenna and the time varying impulse response $h_{I2}$ may correspond to the propagation channel between the interference signal source and the second receive antenna. The parameter y may represent the sum of the received signal models and may comprise a combined signal component $s(h_1 + Ae^{j\theta} h_2)$ and a combined noise plus interference component $n_1 + s_I(h_{I1} + Ae^{j\theta} h_{I2}) + Ae^{j\theta} n_2$.

In step 514, the received signal models may be utilized to determine a signal strength parameter. In this regard, the signal-to-interference-and-noise ratio (SINR) may correspond to the signal strength parameter to be determined. For example, for a 1-Tx and 2-Rx antennas system, the SINR may be determined by maximizing the following expression for various phase, $\theta$, and amplitude, A, factors:

$$SINR = \frac{\|h_1 + Ae^{j\theta} h_2\|^2}{E\|n_1\|^2 + E\|Ae^{j\theta} n_2\|^2 + \|h_{I1} + Ae^{j\theta} h_{I2}\|^2}$$

$$= \frac{\|h_1 + Ae^{j\theta} h_2\|^2}{\sigma^2(1 + A^2) + \|h_{I1} + Ae^{j\theta} h_{I2}\|^2}.$$

where $\sigma^2$ is the noise power. The above SINR equations may be easily extended to the SC MIMO case. The transmit antennas may include CL1 or CL2 transmit diversity weights. The joint transmit-received solution may be formed in that case that may include the transmit CL weights and the additional transmit antenna channel components in the SINR numerator. The SINR numerator may correspond to the y parameter's combined signal component while the SINR denominator may correspond to the y parameter's combined noise plus interference component. The phase factor, $\theta$, may be selected, for example, from a 360-degrees phase rotation while the amplitude factor, A, may be selected, for example, from an set amplitude range. In one embodiment of the invention, the phase factor may be varied in a plurality of phase factor steps over the 360-degrees phase rotation to find the maximum SINR value. In another embodiment of the invention, the phase factor may be varied in a plurality of phase factors steps over the 360-degrees phase rotation and the amplitude factor may be varied in a plurality of amplitude factor values over a range of amplitudes to find the maximum SINR value.

After determining the SINR in step 514, the SWG algorithm block 320 may determine the amplitude and phase to be provided to the RF amplitude and phase controller 312 in step 520. After application of the appropriate amplitude and phase by the RF amplitude and phase controller 312, the flow diagram control may proceed to end step 522 until a next phase and amplitude determination is necessary.

After determining the SINR in step 518, the SWG algorithm block 320 may determine the amplitude and phase to be provided to the RF amplitude and phase controller 312 in step 520. After application of the appropriate amplitude and phase by the RF amplitude and phase controller 312, the flow diagram control may proceed to end step 522 until a next phase and amplitude determination is necessary.

The operations to maximize the signal strength described for steps 510, 514, and 518 may be based on a search algorithm. In an exemplary embodiment of the invention, a search algorithm may be utilized to search over 360-degrees phase rotation in 45 or 90 degree phase factor steps and over a 0-5 amplitude range in 0.25 amplitude values or steps, for example. For a 1-Tx and 2-Rx antenna system, with 90-degree phase factor steps, a phase only search algorithm may calculate 4 SNR or SINR values, for example. For a 2-Tx and 2-Rx antenna system with STTD transmit mode, with 90-degree phase factor steps, a phase only search algorithm may calculate 4 SNR or SINR values. For a 2-Tx and 2-Rx antenna system with the CL1 diversity mode, with 90-degree phase factor steps at both receiver and transmitter, a phase only search algorithm may calculate 4×4=16 SNR or SINR values. For a 2-Tx and 2-Rx antenna system with the CL2 diversity mode, with 90-degree phase factor steps at the receiver and 45-degree phase factor steps and two power scaling weight levels at the transmitter, a phase only search algorithm may calculate 4×8×2=64 SNR or SINR values, for example. The maximum value generated by the algorithm may be the output of the search algorithm.

In another embodiment of the invention, a closed-form mathematical expression may also be utilized to maximize the SNR and/or the SINR. Utilizing an algorithm or closed-form expression that maximizes the SINR or SNR may provide a good compromise between implementation complexity and performance gains. Notwithstanding, the invention is not limited in this regard, and other channel weight algorithms may also be utilized.

Determining channel weights and/or pre-equalization parameters may be performed by monitoring the baseband combined channel estimates, for example. In this regard, a SWBBG may be utilized for monitoring the baseband combined channel estimates generated by, for example, a CPP. U.S. application Ser. No. 11/174,252 provides a detailed description of monitoring baseband combined channel estimates and is hereby incorporated herein by reference in its entirety.

Another embodiment of the invention may provide a machine-readable storage, having stored thereon, a computer program having at least one code section executable by a machine, thereby causing the machine to perform the steps as described above for pre-equalization in a single weight, single channel MIMO system.

The approach described herein for determining pre-equalization parameters in a single channel MIMO system may provide a good compromise between implementation complexity and performance gains in the design and operation of MIMO systems.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling wireless communication, the method comprising:
   receiving in a first receive antenna and at least one additional receive antenna, pre-equalized single channel (SC) current communication signals generated based on previously communicated pre-equalization weight parameters corresponding to signals previously received by at least one of said first receive antenna and said at least one additional receive antenna;
   determining a plurality of current channel estimates based on said received pre-equalized SC current communication signals;
   determining a plurality of channel weights based on said determined plurality of current channel estimates; and
   modifying pre-equalized SC subsequent communication signals received via said at least one additional receive antenna based on said determined plurality of channel weights.

2. The method according to claim 1, comprising modifying said pre-equalized SC subsequent communication signals received via said first receive antenna.

3. The method according to claim 1, comprising:
   determining a plurality of channel estimates based on said signals previously received by said first receive antenna and said at least one additional receive antenna; and
   determining said previously communicated pre-equalization weight parameters based on said determined plurality of channel estimates.

4. The method according to claim 1, comprising if a closed loop mode of operation is active, determining closed loop diversity weight parameters and said plurality of channel weights concurrently.

5. The method according to claim 1, comprising determining said previously communicated pre-equalization weight parameters based on least mean squares (LMS) algorithm.

6. The method according to claim 1, comprising determining said previously communicated pre-equalization weight parameters based on recursive least squares (RLS) algorithm.

7. The method according to claim 1, comprising determining said previously communicated pre-equalization weight parameters based on direct matrix inversion (DMI).

8. The method according to claim 1, comprising determining said previously communicated pre-equalization weight parameters based on a cost function.

9. The method according to claim 1, comprising determining said previously communicated pre-equalization weight parameters periodically.

10. The method according to claim 1, comprising determining said previously communicated pre-equalization weight parameters continuously.

11. A system for handling wireless communication, the system comprising:
    a first receive antenna and at least one additional receive antenna that enables receipt of pre-equalized single channel (SC) current communication signals generated based on previously communicated pre-equalization weight parameters corresponding to signals previously received by at least one of said first receive antenna and said at least one additional receive antenna;
    a single weight baseband generator (SWBBG) that enables determination of a plurality of current channel estimates based on said received pre-equalized SC current communication signals;
    said SWBBG enables determination of a plurality of channel weights based on said determined plurality of current channel estimates; and
    said SWBBG enables generation of a plurality of signals that modify pre-equalized SC subsequent communication signals received via said at least one additional receive antenna based on said determined plurality of channel weights.

12. The system according to claim 11, wherein said SWBBG enables generation of at least one addition signal that modifies said pre-equalized SC subsequent communication signals received via said first receive antenna.

13. The system according to claim 11, wherein said SWBBG enables determination of a plurality of channel estimates based on said signals previously received by said first receive antenna and said at least one additional receive antenna and said SWBBG enables determination of said previously communicated pre-equalization weight parameters based on said determined plurality of channel estimates.

14. The system according to claim 11, wherein said SWBBG enables determination of closed loop diversity weight parameters and said plurality of channel weights concurrently when a closed loop mode of operation is active.

15. The system according to claim 11, comprising a pre-equalizer that enables determination of said previously communicated pre-equalization weight parameters based on least mean squares (LMS) algorithm.

16. The system according to claim 11, comprising a pre-equalizer that enables determination of said previously communicated pre-equalization weight parameters based on recursive least squares (RLS) algorithm.

17. The system according to claim 11, comprising a pre-equalizer that enables determination of said previously communicated pre-equalization weight parameters based on direct matrix inversion (DMI).

18. The system according to claim 11, comprising a pre-equalizer that enables determination of said previously communicated pre-equalization weight parameters based on a cost function.

19. The system according to claim 11, comprising a pre-equalizer that enables determination of said previously communicated pre-equalization weight parameters periodically.

20. The system according to claim 11, comprising a pre-equalizer that enables determination of said previously communicated pre-equalization weight parameters continuously.

* * * * *